United States Patent
Taylor et al.

(10) Patent No.: US 7,113,201 B1
(45) Date of Patent: Sep. 26, 2006

(54) IMAGE PROCESSING APPARATUS

(75) Inventors: Michael James Taylor, Surrey (GB); Simon Michael Rowe, Surrey (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/533,398

(22) Filed: Mar. 22, 2000

(30) Foreign Application Priority Data

Apr. 14, 1999 (GB) .............................................. 9908545

(51) Int. Cl.
*H04N 7/14* (2006.01)

(52) U.S. Cl. ................ 348/14.08; 348/14.09; 348/14.11; 348/14.12; 348/169

(58) Field of Classification Search ... 348/14.01–14.08, 348/14.09, 14.1, 14.11, 14.12, 169, 208.14; 370/260, 261; 707/1, 100
See application file for complete search history.

(56) References Cited

U.S. PATENT DOCUMENTS

| | | | |
|---|---|---|---|
| 3,392,392 A | 7/1968 | Magnuski | |
| 3,601,530 A | 8/1971 | Edson et al. | 178/5.6 |
| 4,333,170 A | 6/1982 | Mathews et al. | 367/125 |

FOREIGN PATENT DOCUMENTS

| | | |
|---|---|---|
| DE | 195 28425 C1 | 5/1996 |
| EP | 0 356 105 | 2/1990 |
| EP | 0659018 A2 | 6/1995 |
| GB | 2 140 558 A | 11/1984 |
| GB | 2342802 | 4/2000 |
| JP | 404297196 A * | 10/1992 |
| JP | 404301976 A * | 10/1992 |
| JP | 7-306012 | 11/1995 |
| WO | WO 99/60788 | 11/1999 |

OTHER PUBLICATIONS

Patent Abstracts of Japan, vol. 1997, No. 04, Apr. 30, 1997, JP 08 322796 A.
Patent Abstracts of Japan, vol. 1998, No. 10, Aug. 31, 1998, JP 10 145763.
Valente, S., et al., "An Analysis/Synthesis Cooperation for Head Tracking and Video Face Cloning", Proceedings ECCV '98 Workshop on Perception of Human Action, University of Freiberg, Germany, Jun. 6, 1998.
Wiles, C., et al., "Calibrating and 3D modelling with a multi–camera system", 1999 IEEE Workshop on Perceptual User Interfaces.
Schödl, A., et al., "Head Tracking Using a Textured polygonal Model", Proceeding 1998 Workshop on Perceptual User Interfaces.

(Continued)

*Primary Examiner*—Melur Ramakrishnaiah
(74) *Attorney, Agent, or Firm*—Fitzpatrick, Cella, Harper & Scinto

(57) ABSTRACT

Image data from a plurality of cameras 2-1, 2-2, 2-3 showing the movements of a number of people, for example in a meeting, and sound data from a directional microphone array 4 is processed by a computer processing apparatus 24 to archive the data in a meeting archive database 60. The image data is processed to determine the three-dimensional position and orientation of each person's head and to determine at whom each person is looking. The sound data is processed to determine the direction from which the sound came. Processing is carried out to determine who is speaking by determining which person has his head in a position corresponding to the direction from which the sound came. Having determined which person is speaking, the personal speech recognition parameters for that person are selected and used to convert the sound data to text data. Image data to be archived is chosen by selecting the camera which best shows the speaking participant and the participant to whom he is speaking. Image data, sound data, text data and data defining at whom each person is looking is stored in the meeting archive database 60.

33 Claims, 24 Drawing Sheets

U.S. PATENT DOCUMENTS

| | | | | |
|---|---|---|---|---|
| 5,206,721 A | * | 4/1993 | Ashida et al. | 348/14.1 |
| 5,231,674 A | | 7/1993 | Cleveland et al. | 382/6 |
| 5,347,306 A | | 9/1994 | Nitta | 348/15 |
| 5,500,671 A | | 3/1996 | Andersson et al. | 348/15 |
| 5,686,957 A | | 11/1997 | Baker | 348/36 |
| 5,995,936 A | | 11/1999 | Brais et al. | 704/275 |
| 6,307,526 B1 | * | 10/2001 | Mann | 345/8 |
| 6,593,956 B1 | | 7/2003 | Potts et al. | 348/14.09 |

OTHER PUBLICATIONS

Haykin, "Adaptive Filter Theory, Second Edition", Prentice Hall, pp. 57–67, ISBN 0–13–013236–5.

Haralick, R.M., et al., "Computer and Robot Vision Vol. 2", Addison–Wesley Publishing Company, 1993, pp. 293–378, ISBN 0–201–56943–4.

* cited by examiner

| NUMBER | NAME |
|--------|------|
| 1 | MR. A |
| 2 | MISS. B |
| 3 | MR. C |
| 4 | MISS. D |
| 5 | FLIP CHART |

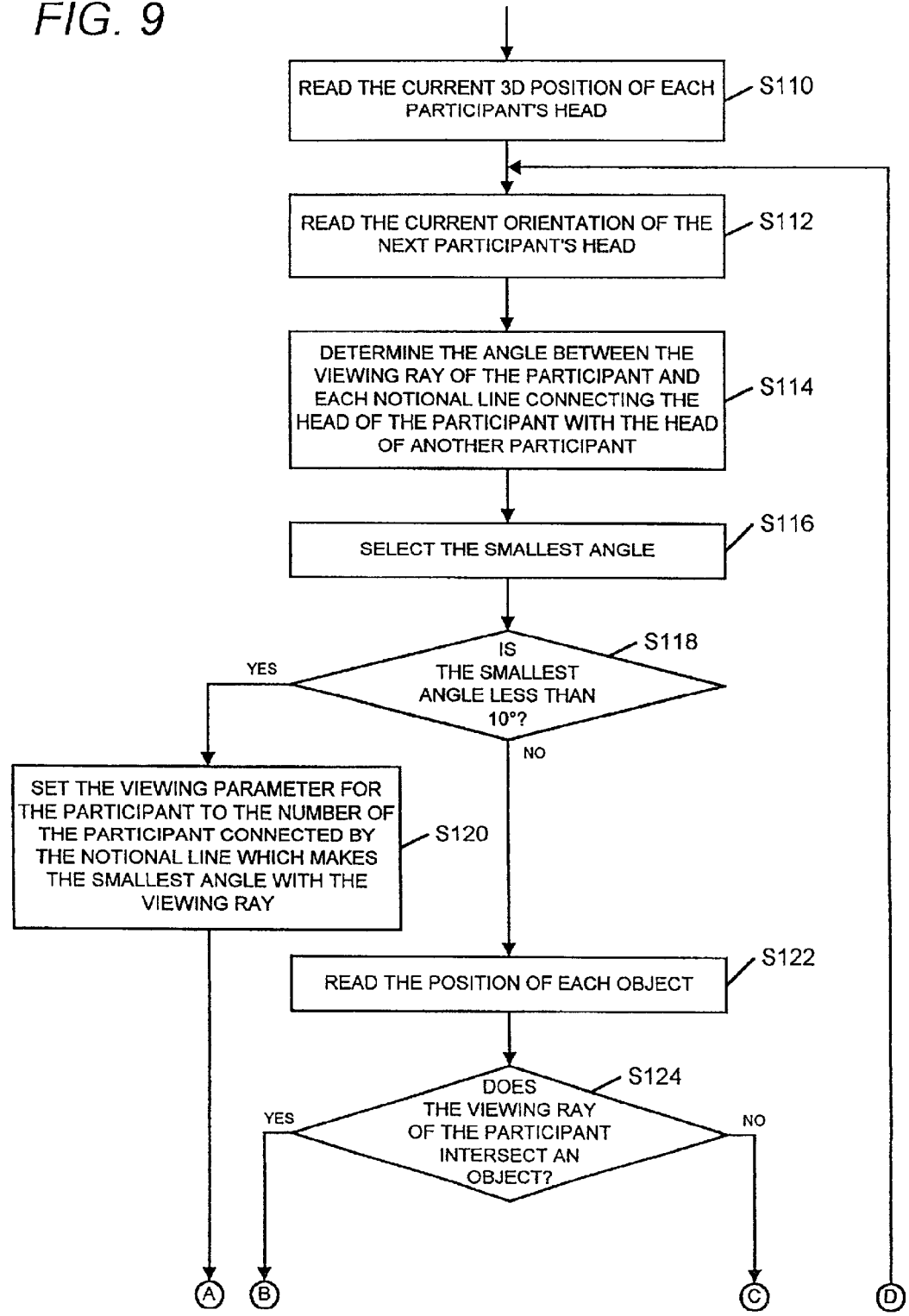

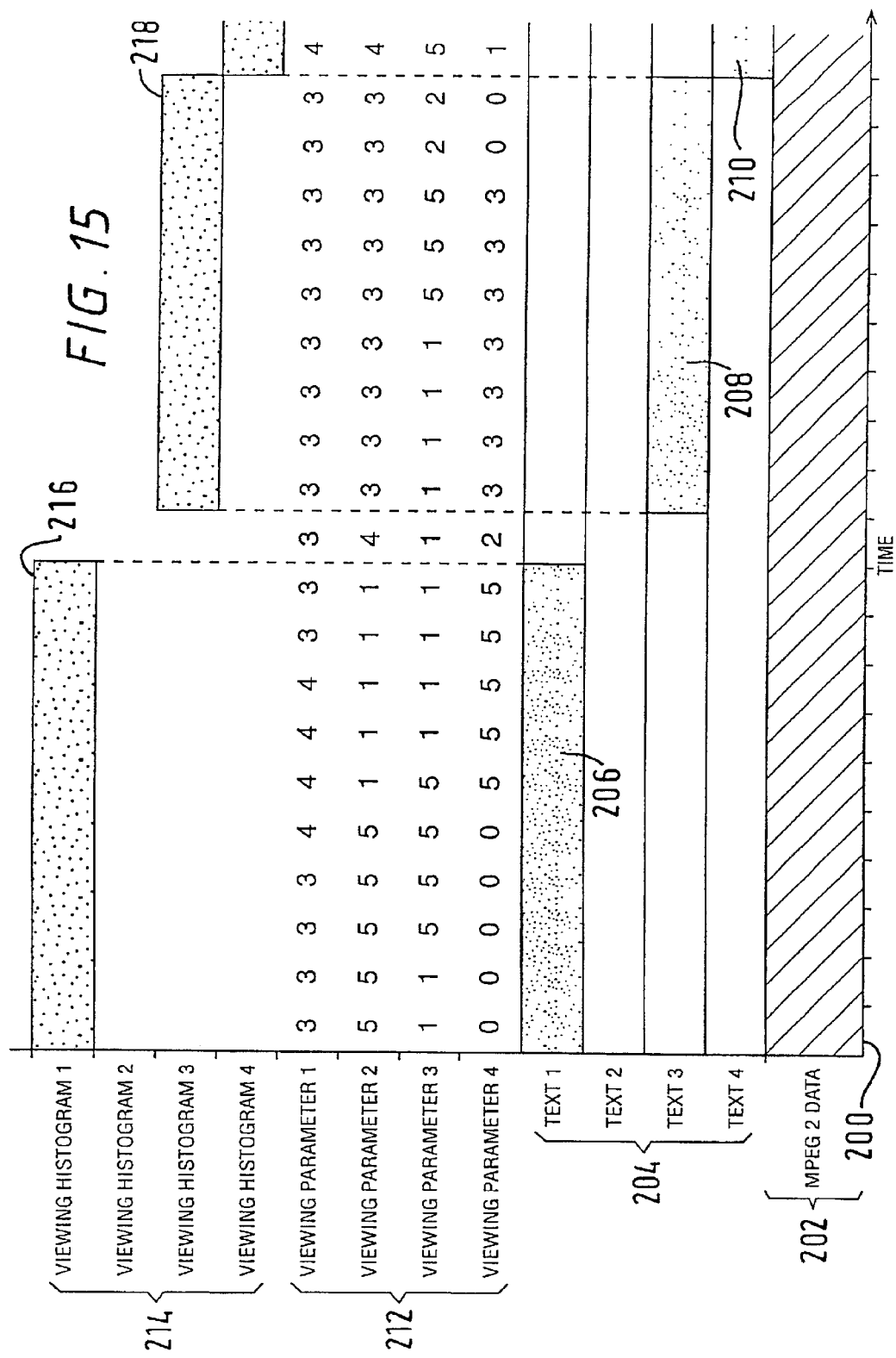

IMAGE PROCESSING APPARATUS

The present invention relates to the archiving of image data.

Many databases exist for the storage of image data. However, problems exist because, inter alia, the amount of image data to be stored can be large, and because ways in which the database can be interrogated to retrieve information therefrom are limited.

The present invention has been made with this in mind.

According to the present invention, there is provided an apparatus or method in which processing is performed to archive image data from a plurality of cameras which shows people talking. The person speaking and the person (or object) at whom he is looking are determined, and a subset of the image data is selected to be archived in dependence thereon.

In this way, it is not necessary to store the image data from all of the cameras, thereby reducing storage requirements.

The present invention also provides an apparatus or method for selecting image data from among image data recorded by a plurality of cameras which shows people talking, in which the position in three dimensions of at least the head of the person who is speaking and the person (or object) at whom he is looking are determined by processing at least some of the image data, and the selection of image data is made based on the determined positions and the views of the cameras.

The present invention further provides instructions, including in signal and recorded form, for configuring a programmable processing apparatus to become arranged as an apparatus, or to become operable to perform a method, in such a system.

Embodiments of the invention will now be described, by way of example only, with reference to the accompanying drawings, in which.

Figure 2:
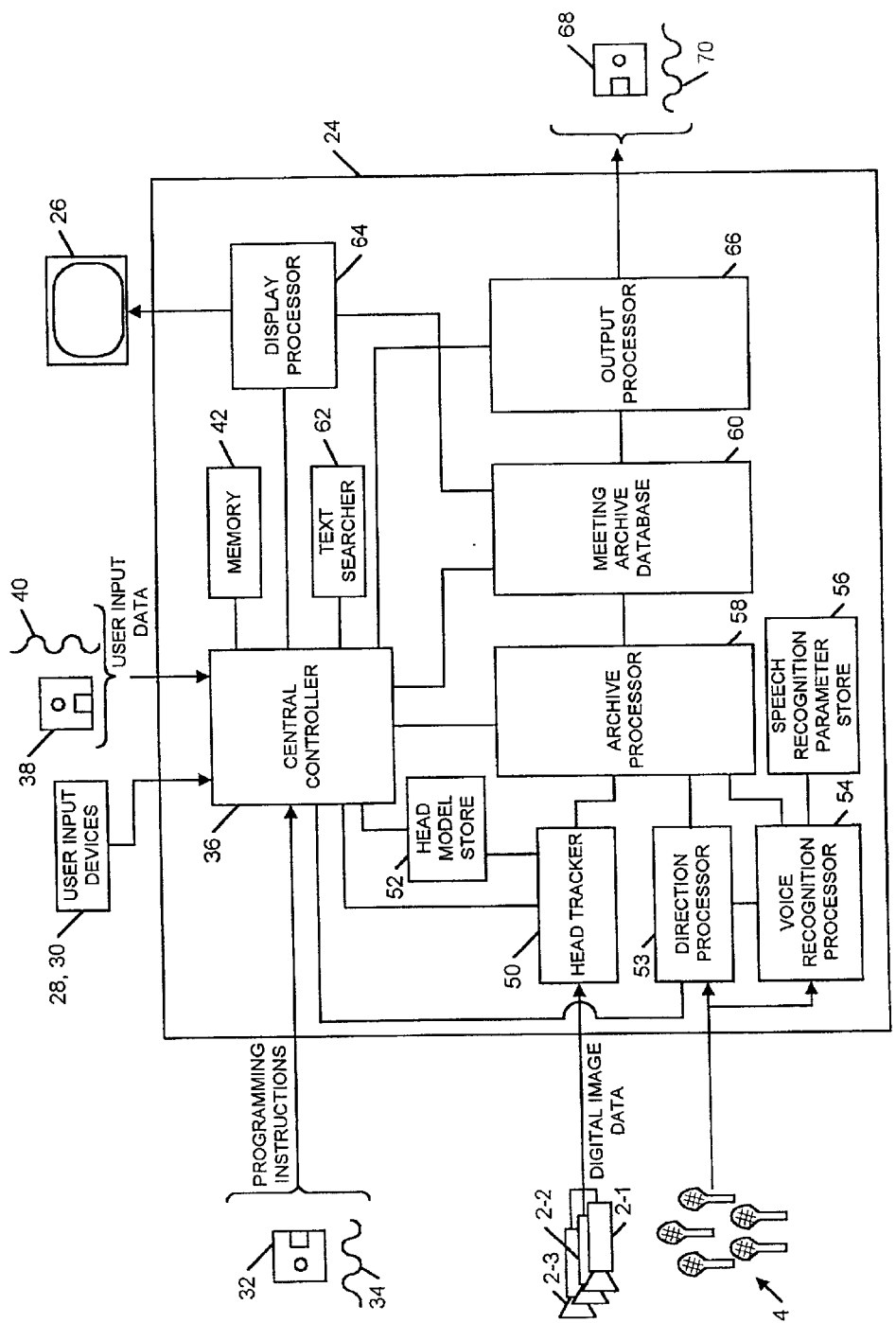
FIG. 2 is a block diagram showing an example of notional functional components within a processing apparatus in an embodiment.
Figure 3:
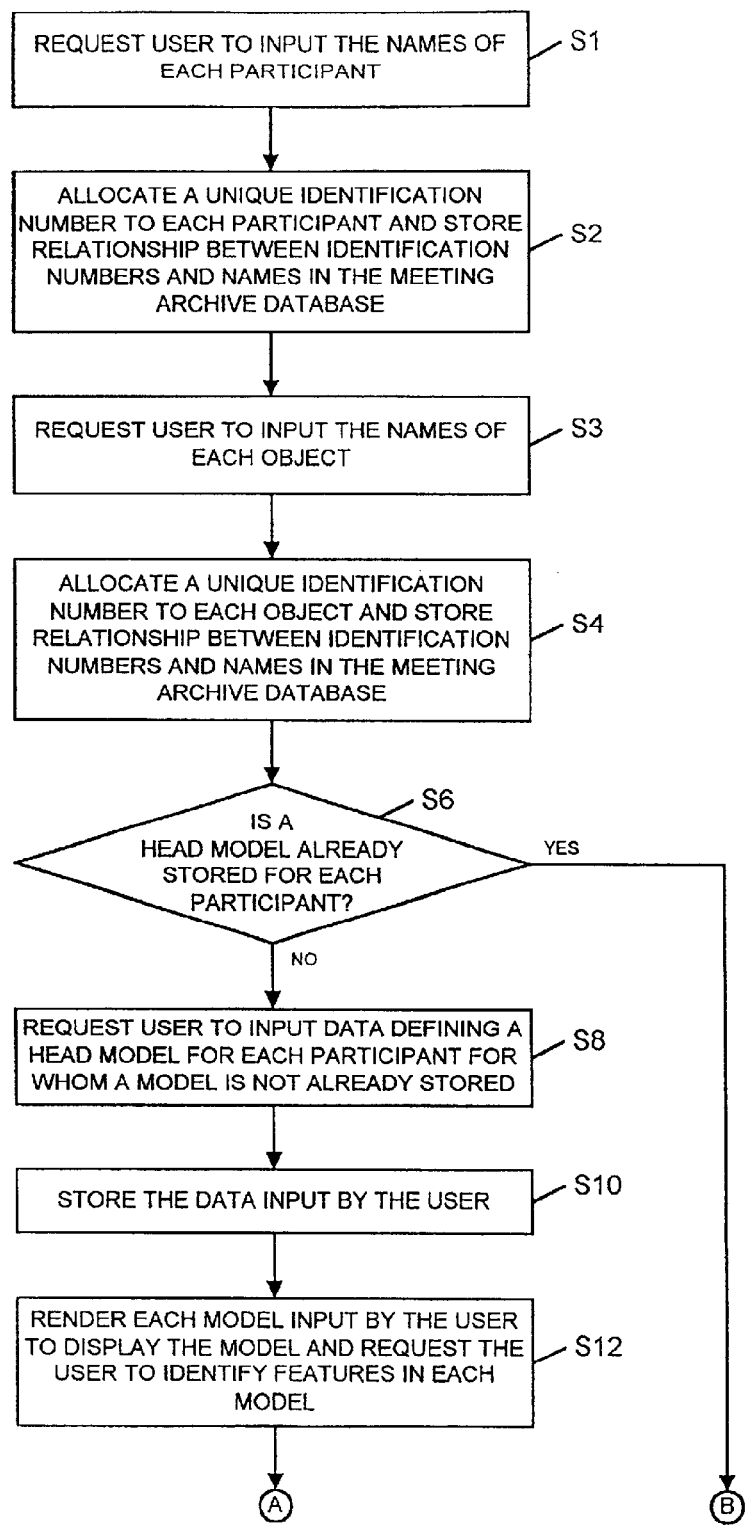
FIG. 3 shows the processing operations performed by processing apparatus 24 in FIG. 2 prior to the meeting shown in FIG. 1 between the participants starting.
Figure 3:
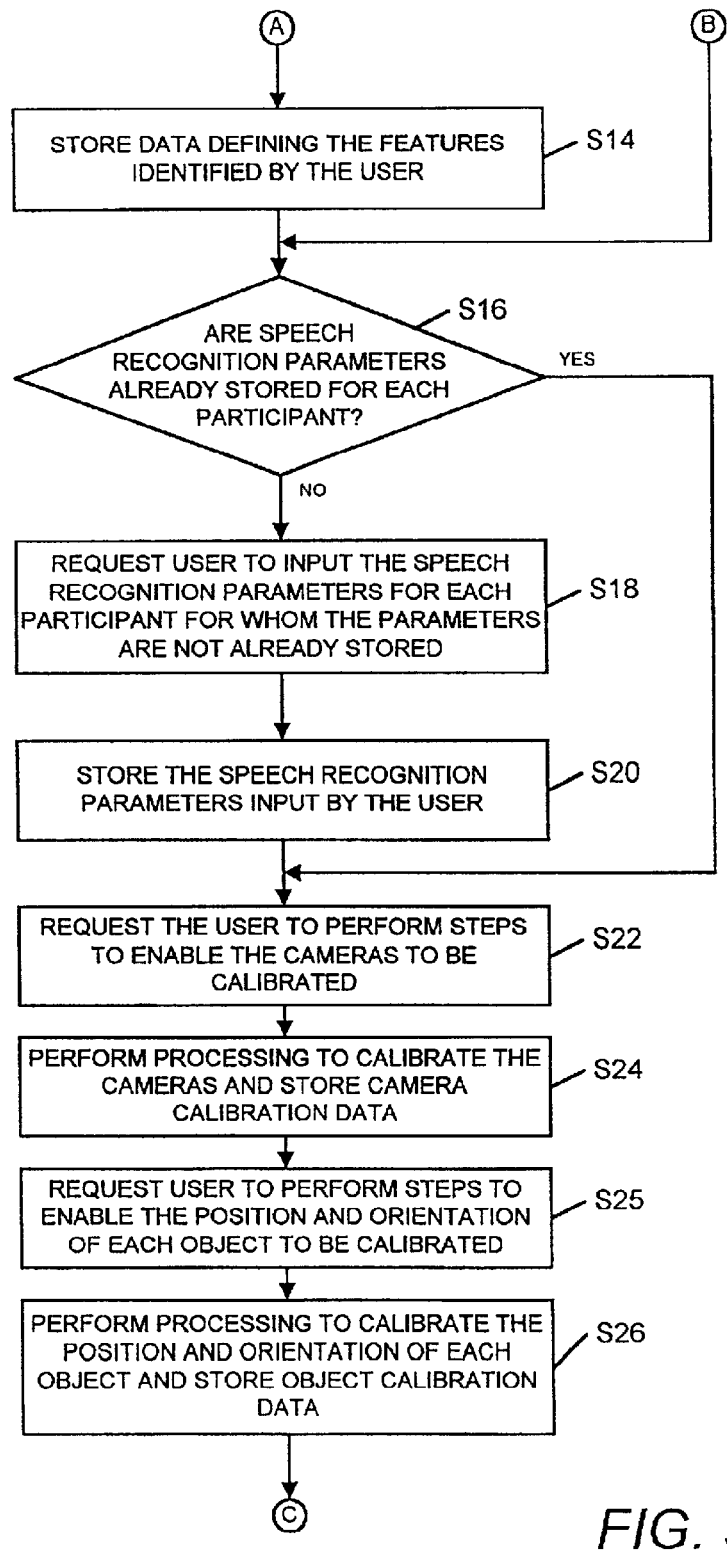
Figure 3:
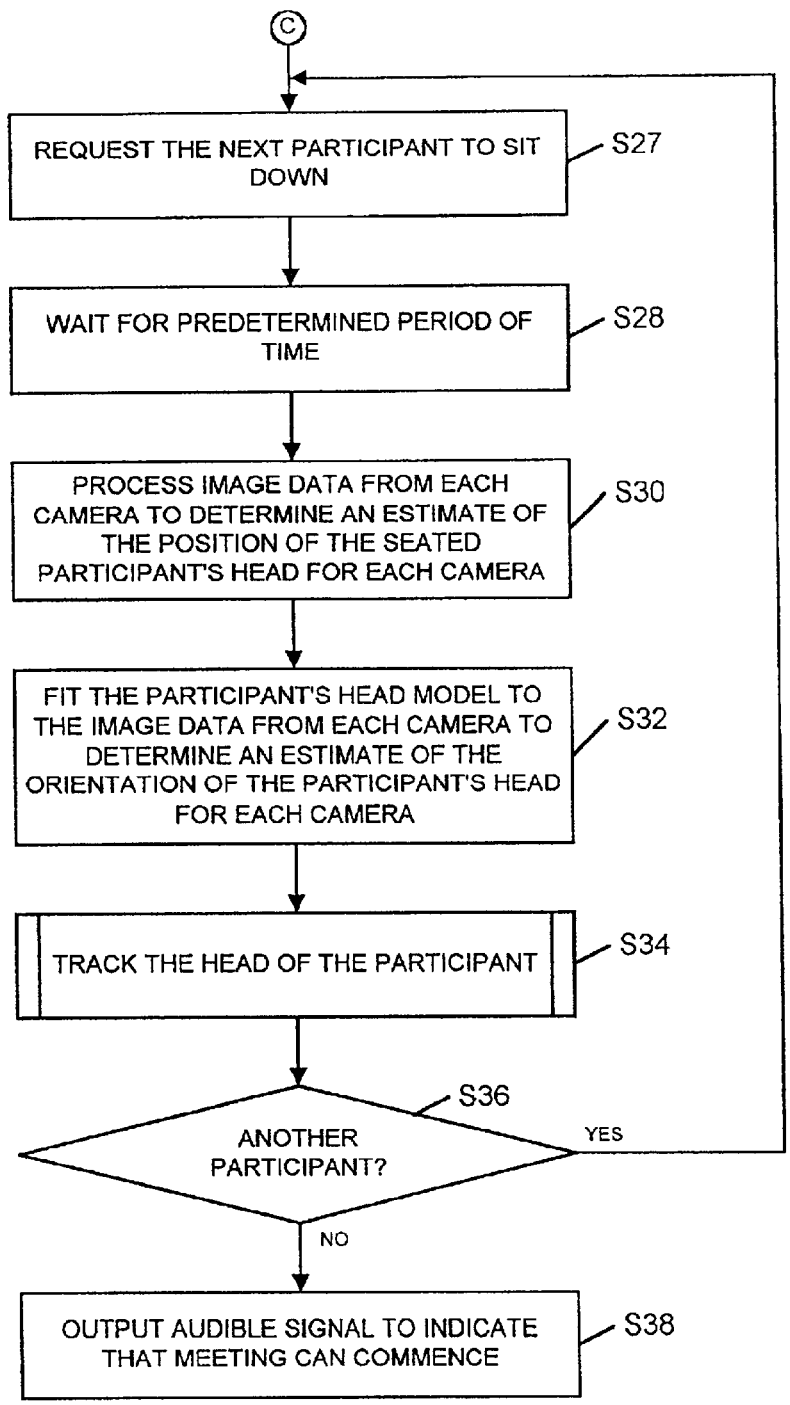
Figure 5:
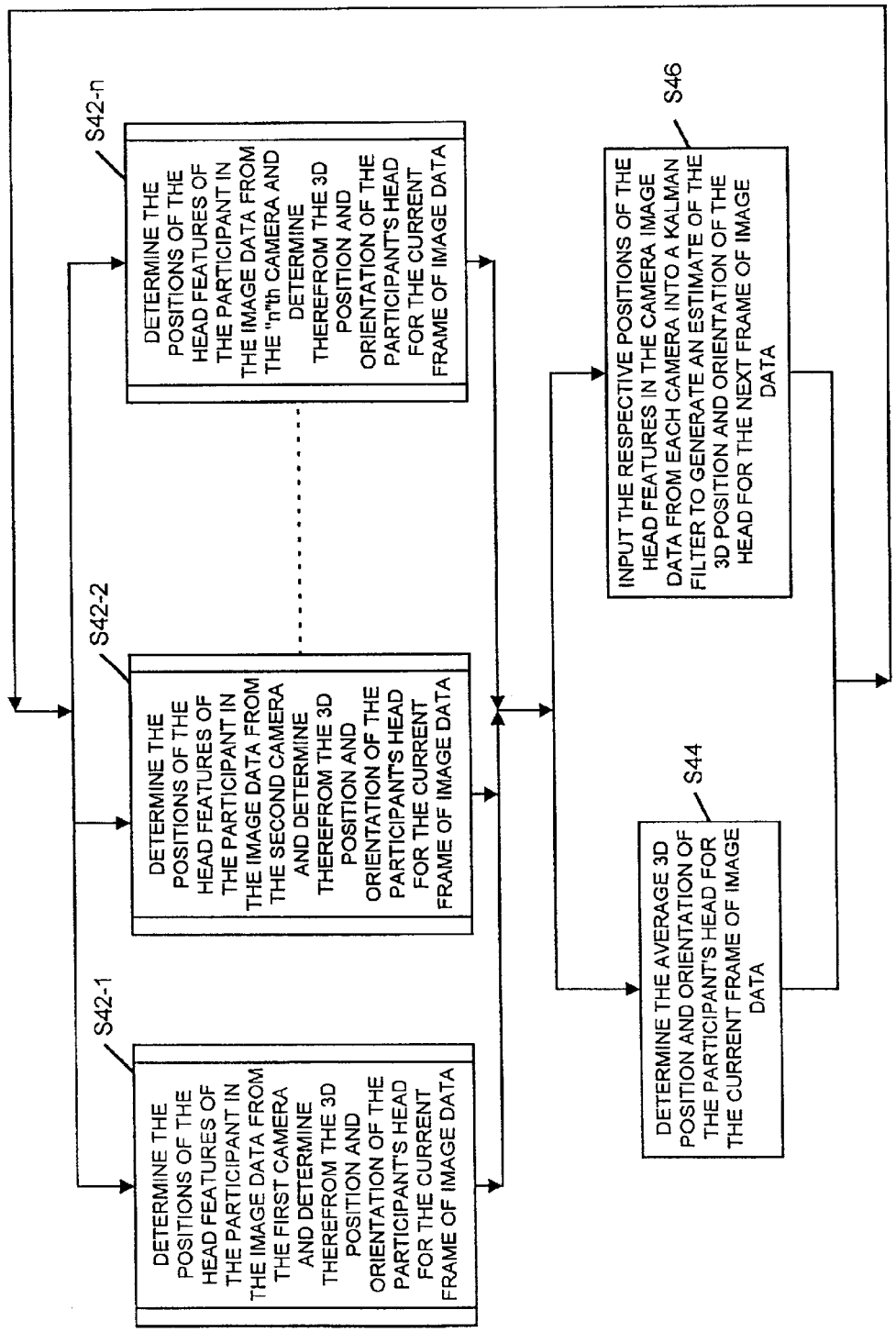
Figure 6:
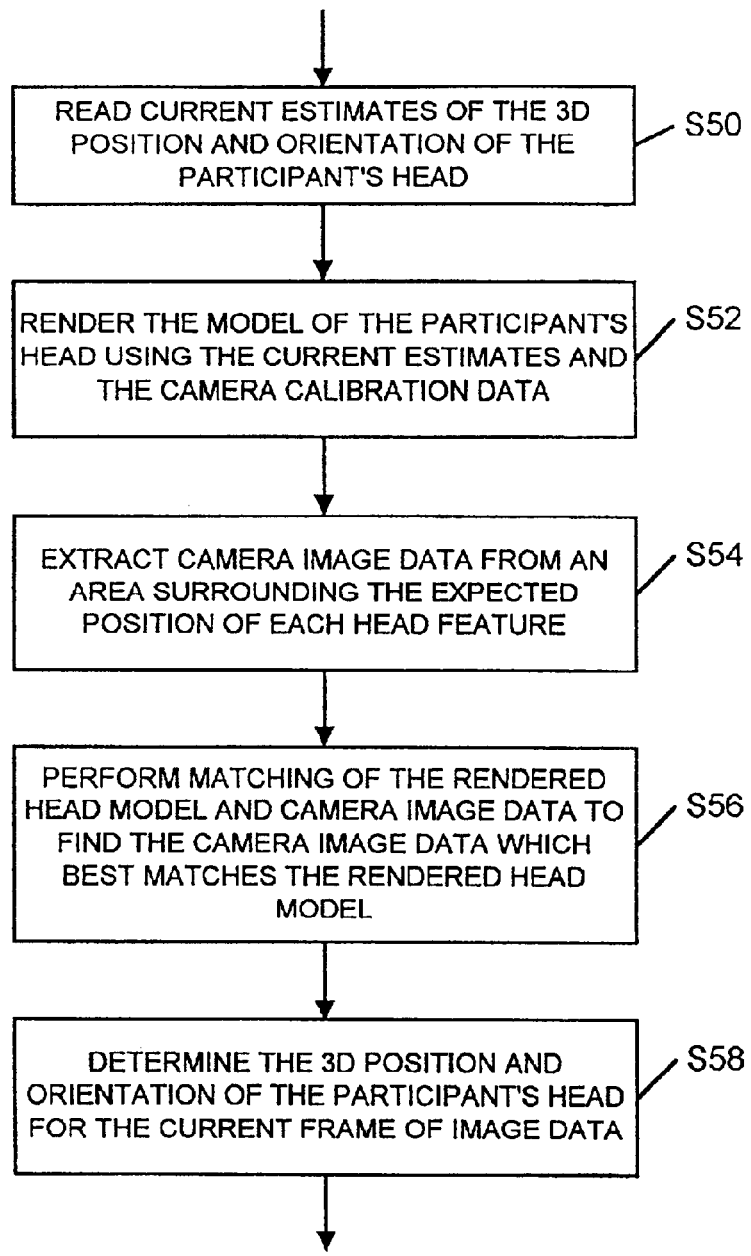
Figure 7:
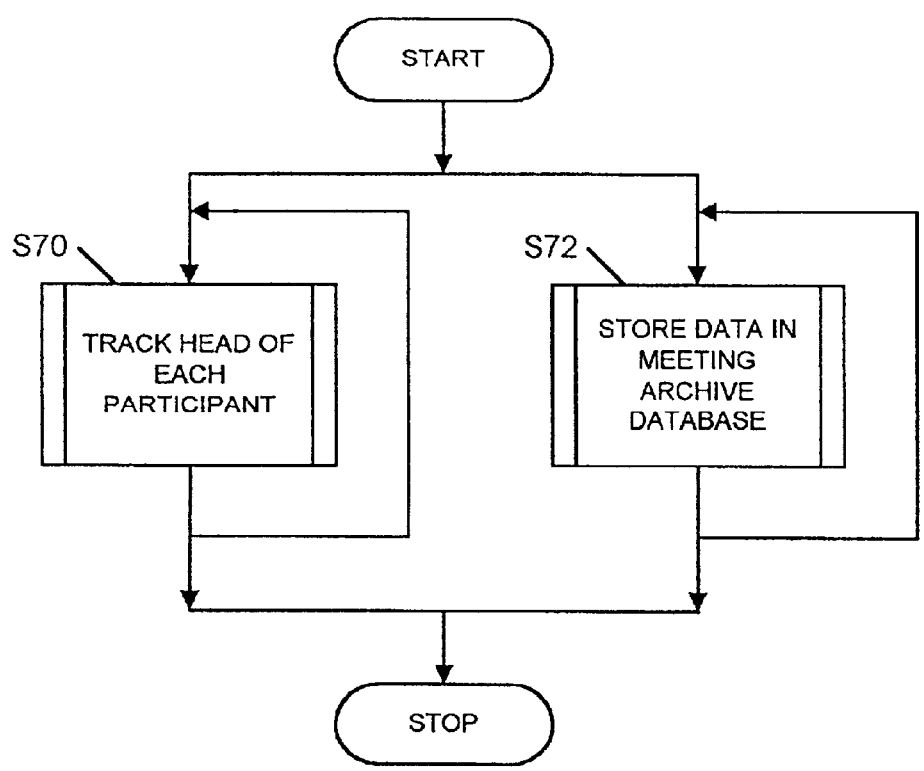
Figure 8:
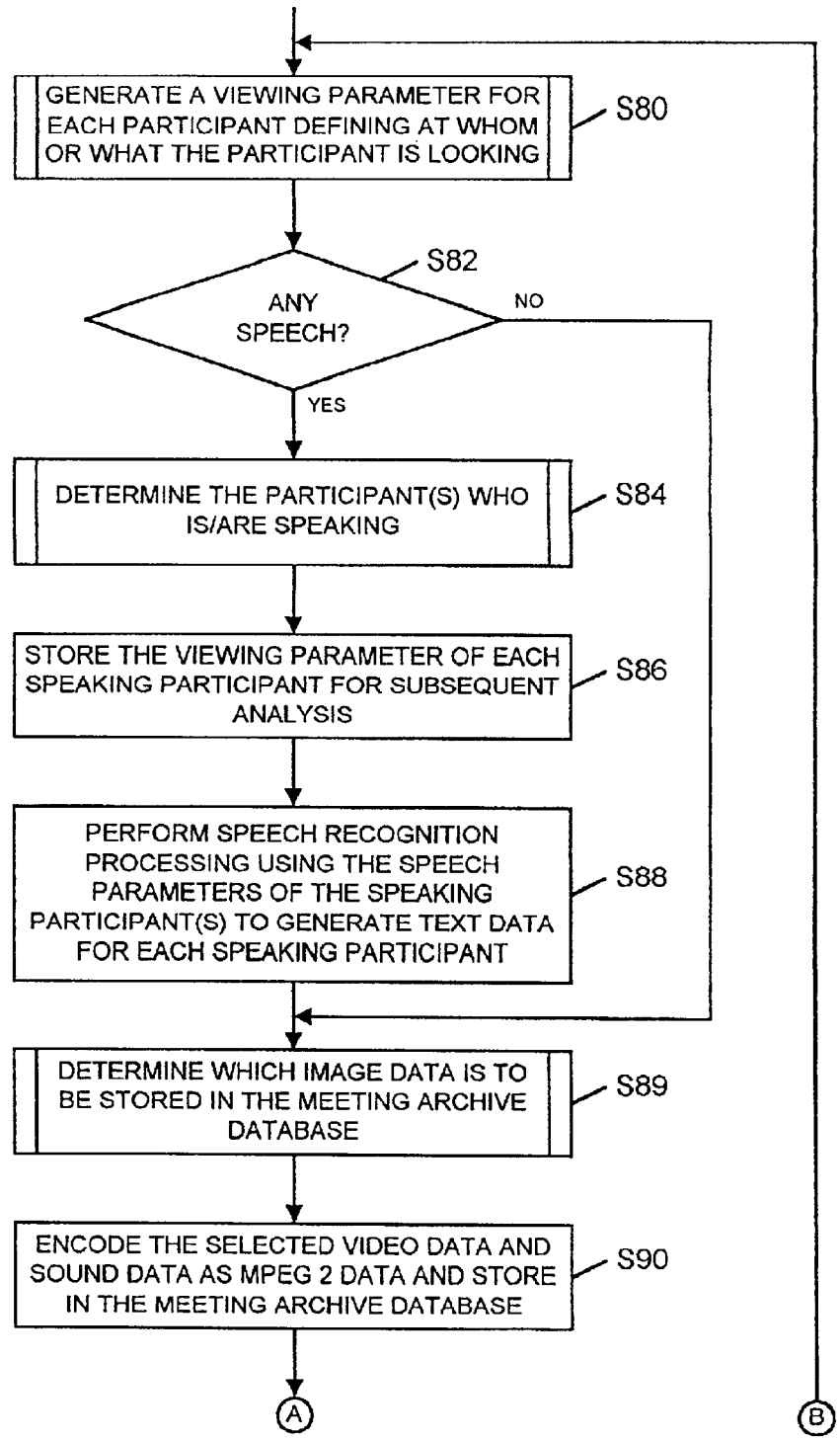
Figure 8:
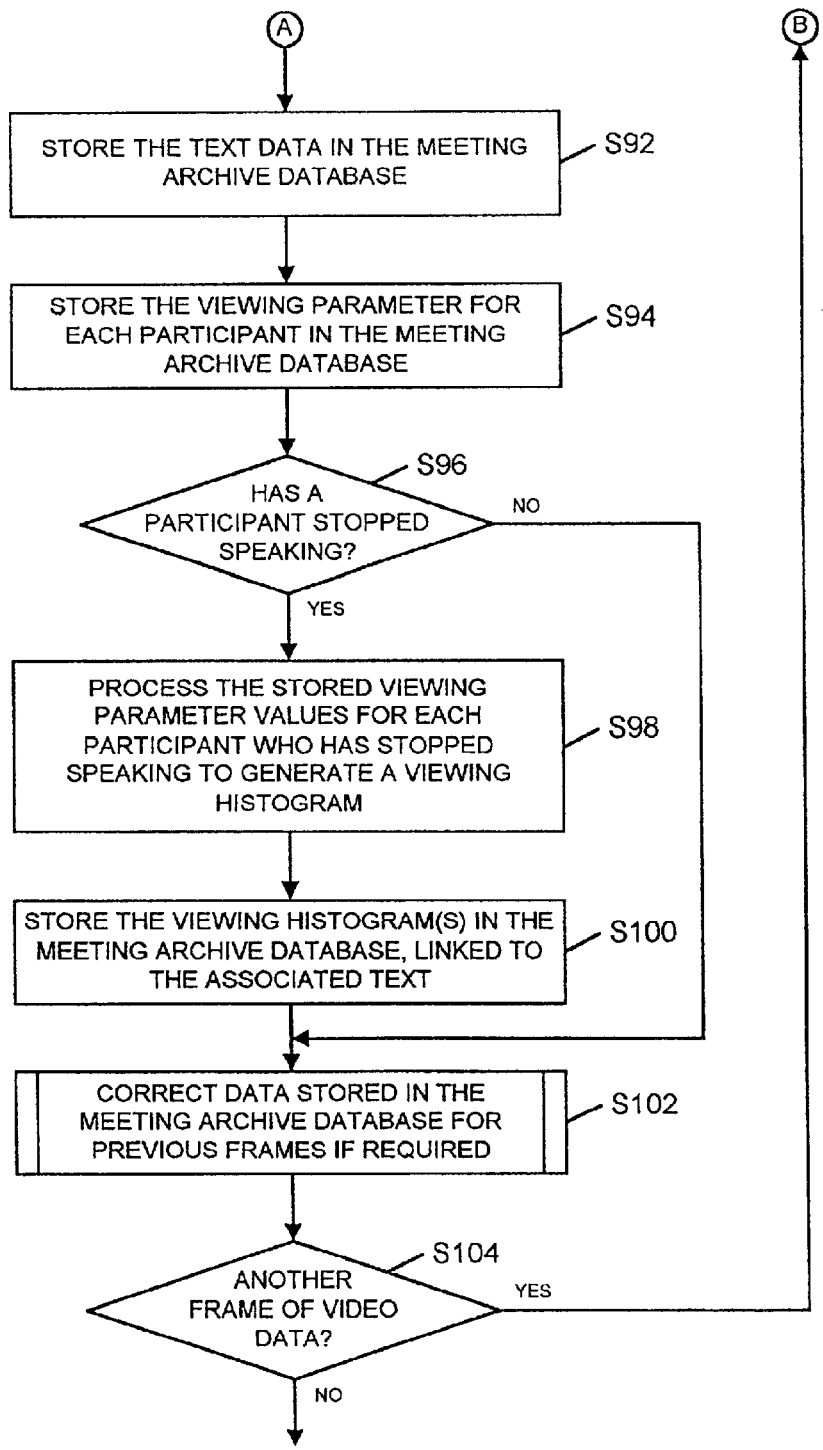
Figure 9:
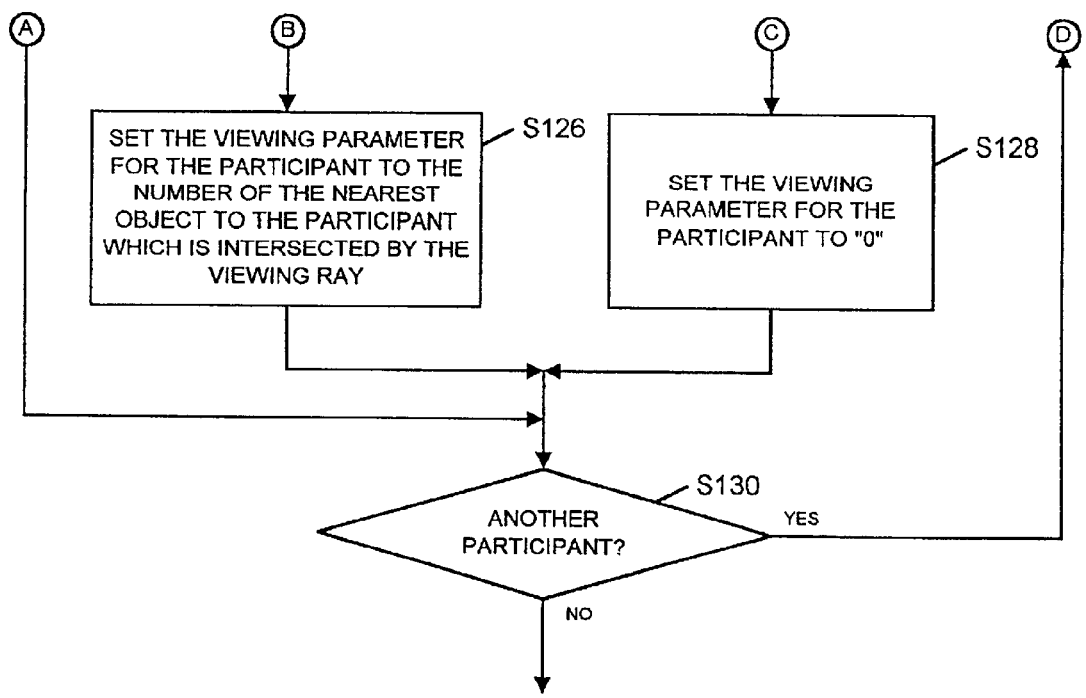
Figure 10:
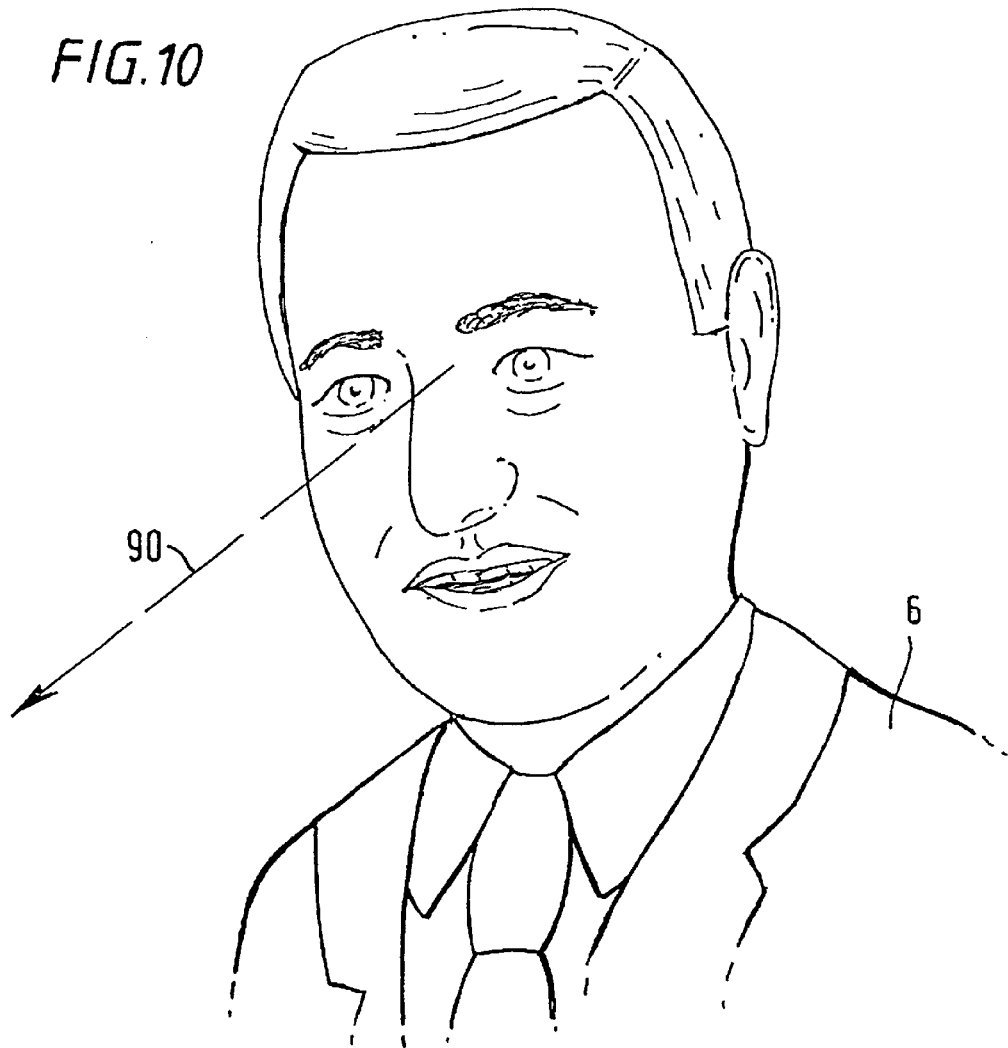
Figure 11:
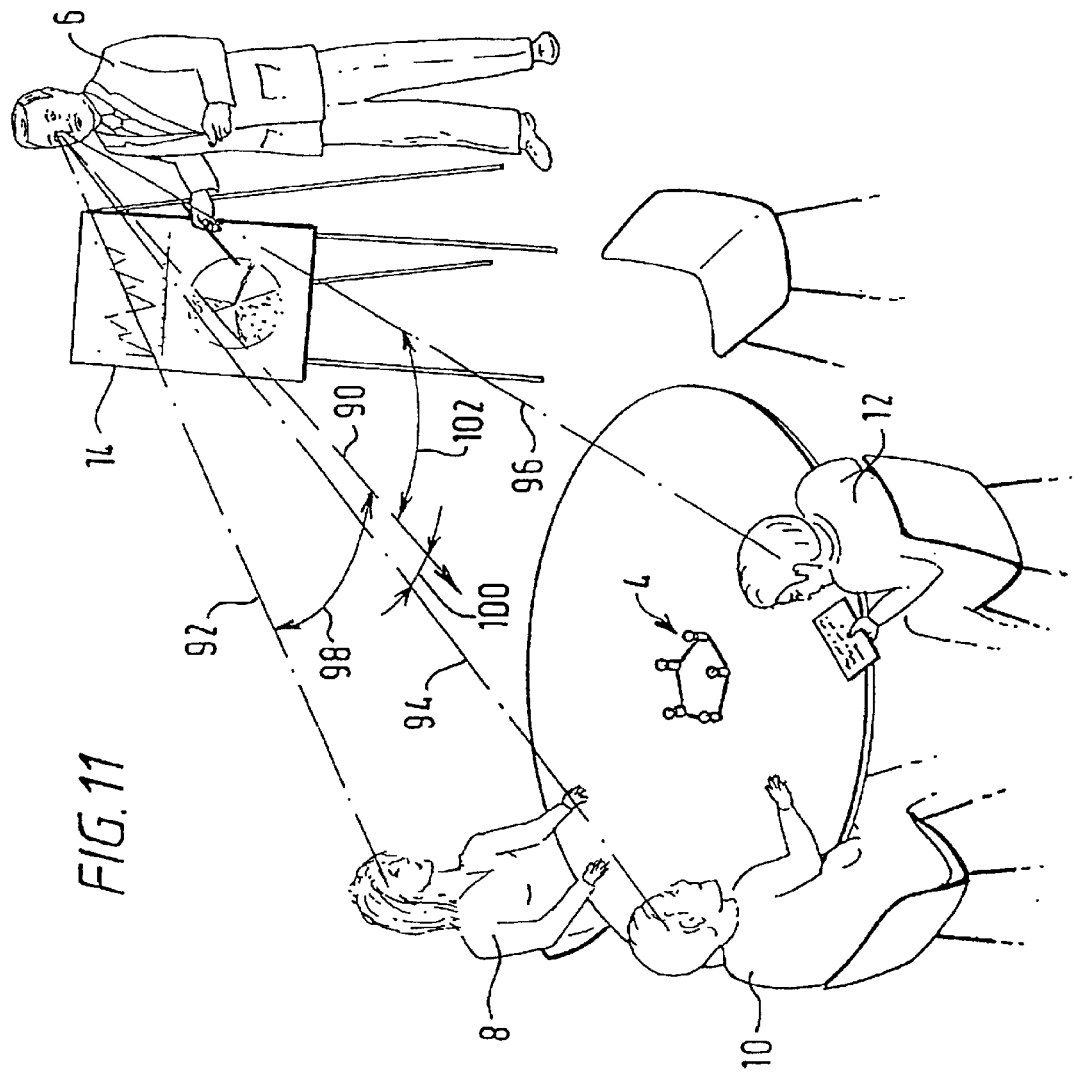
Figure 12:
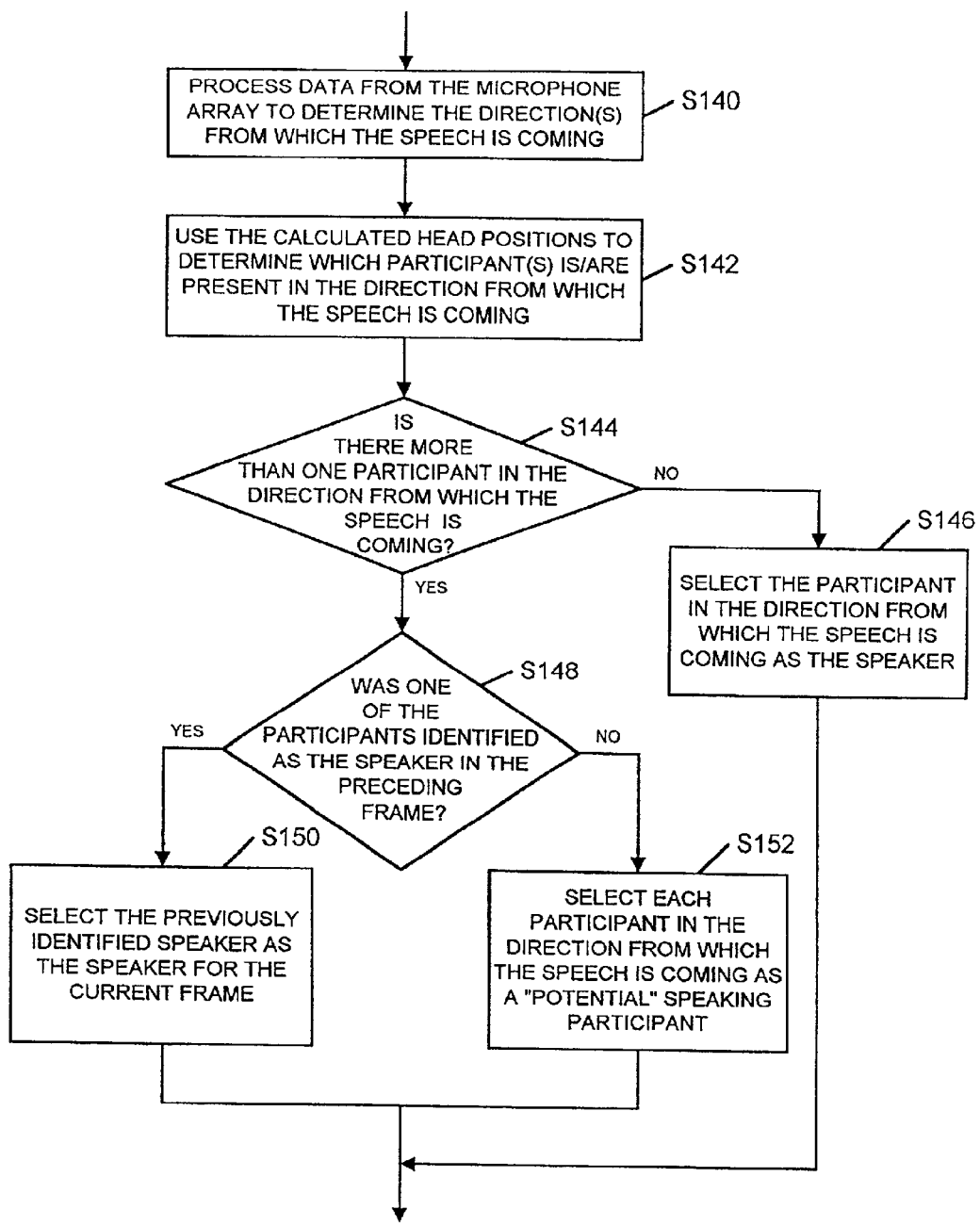
Figure 13:
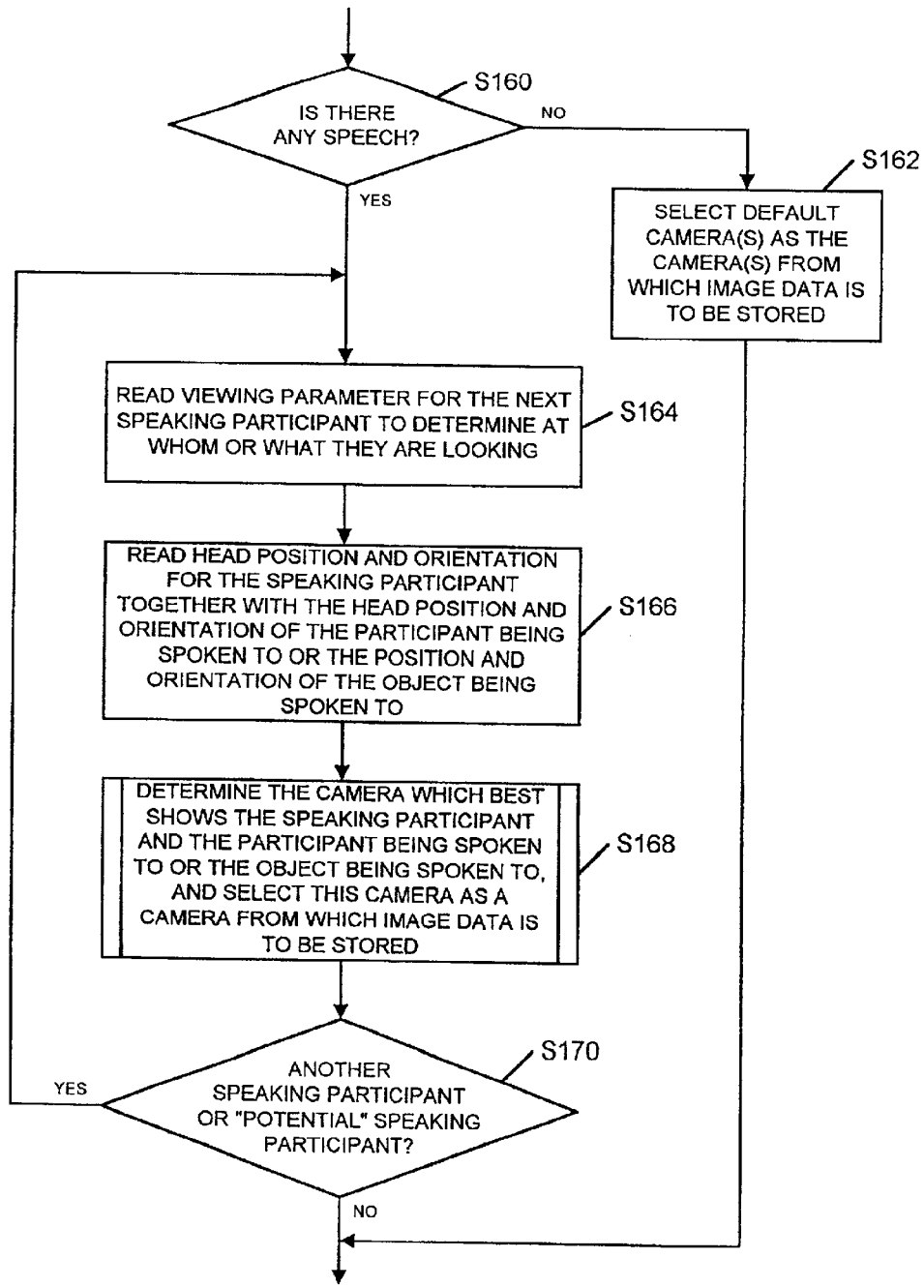
Figure 14:
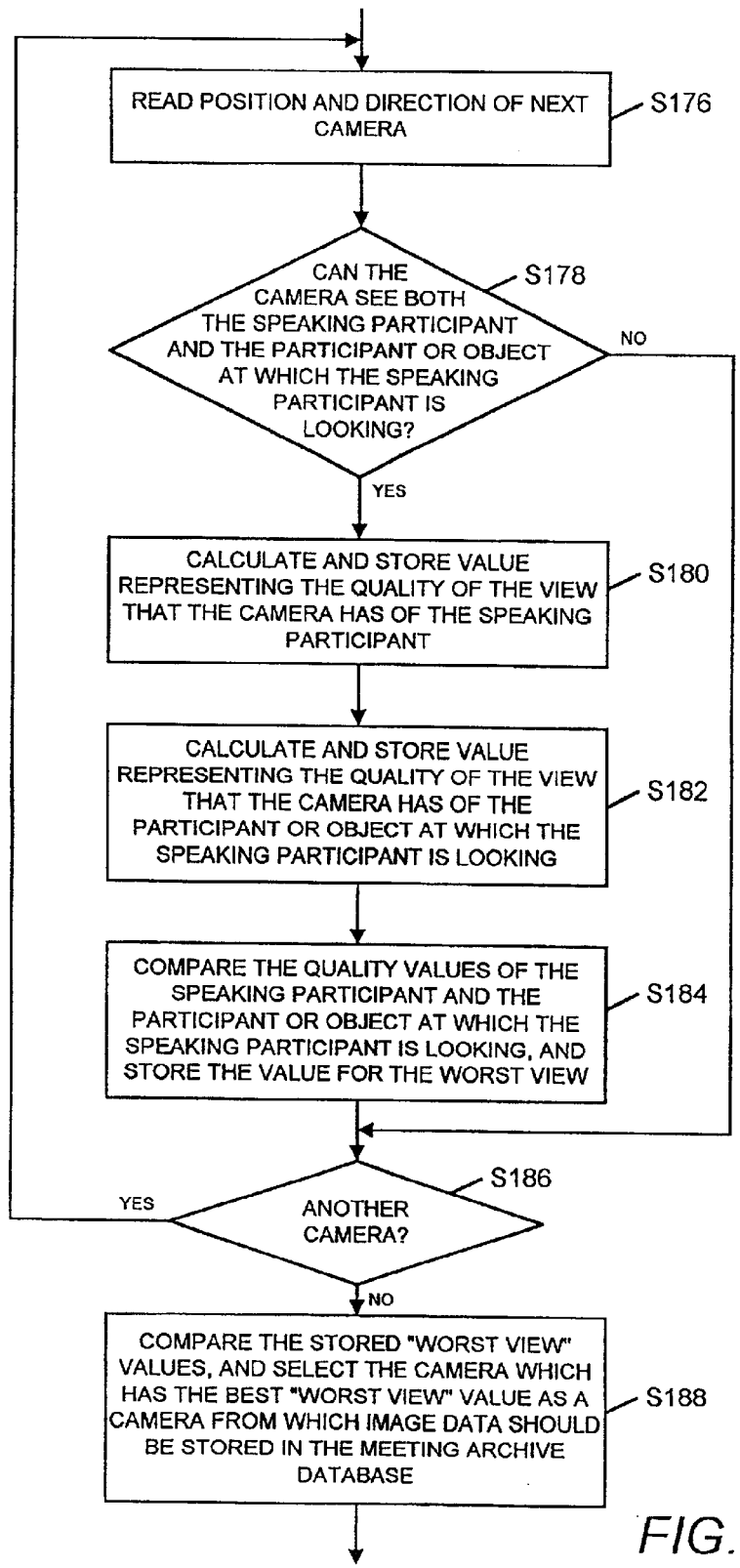
Figure 16A:
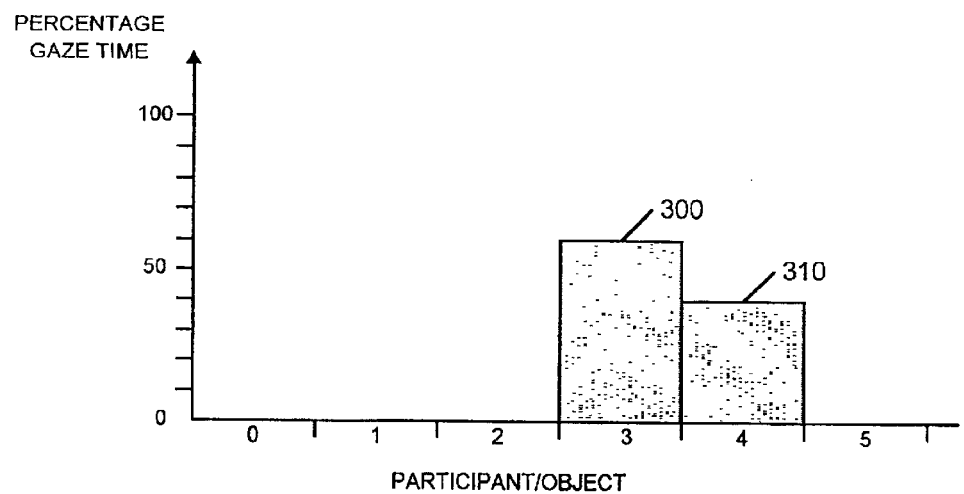
Figure 16B:
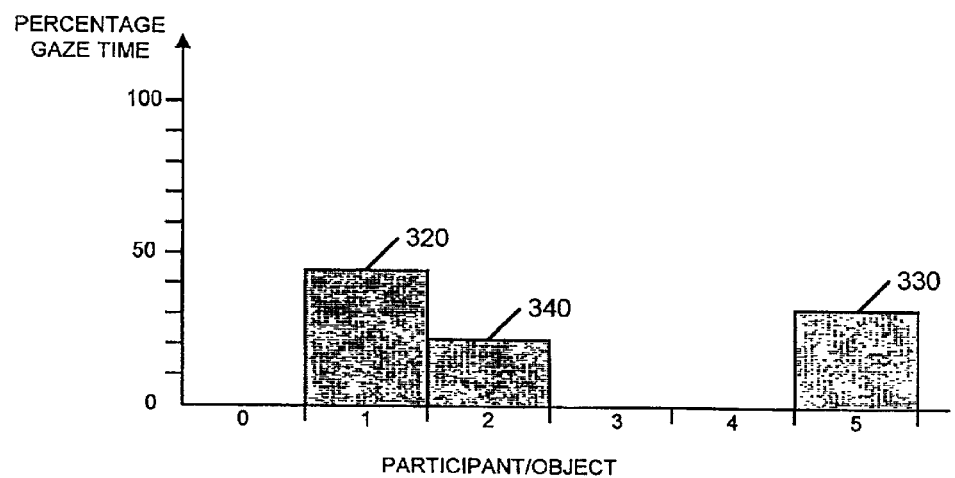
Figure 17:
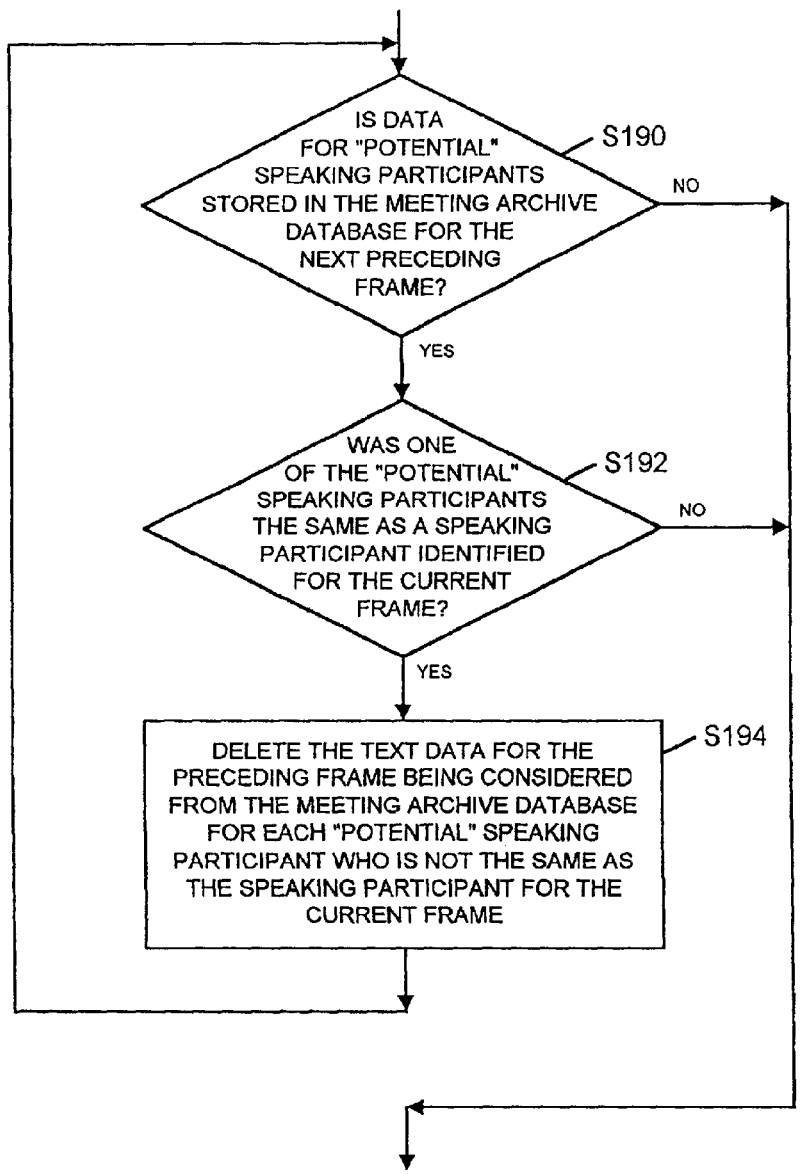
Figure 18:
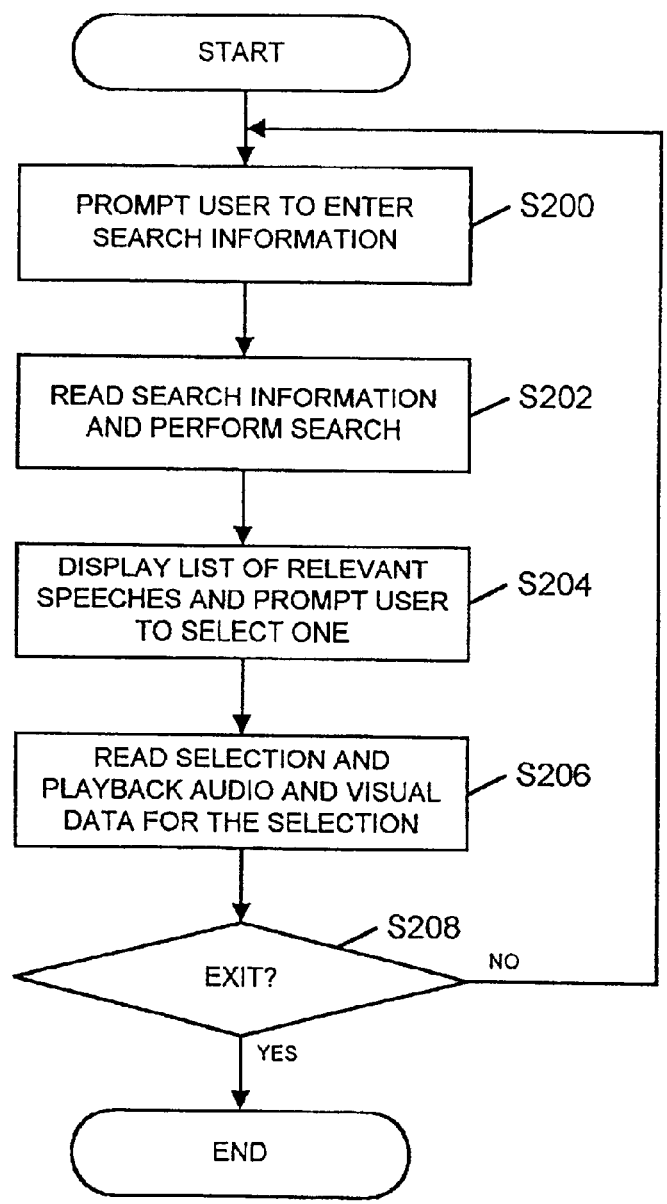
Figure 19:
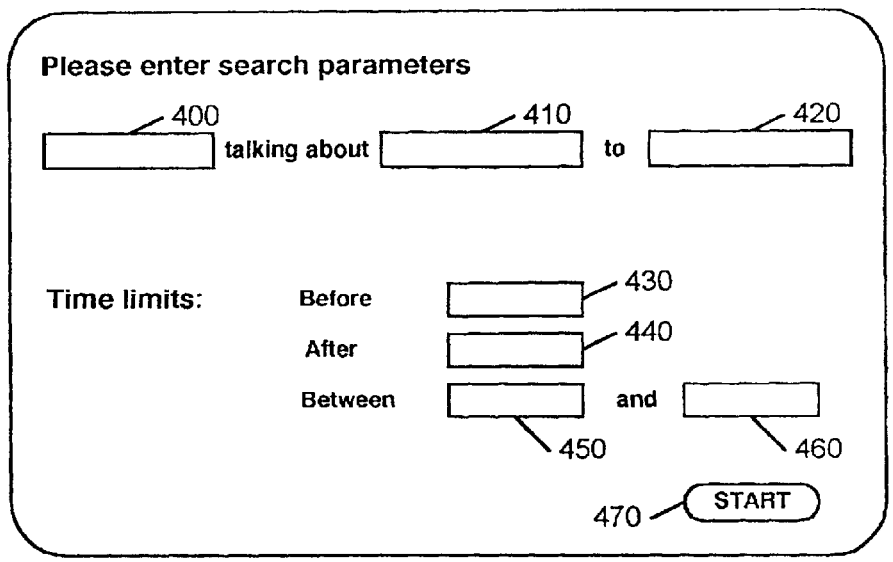
Figure 19:
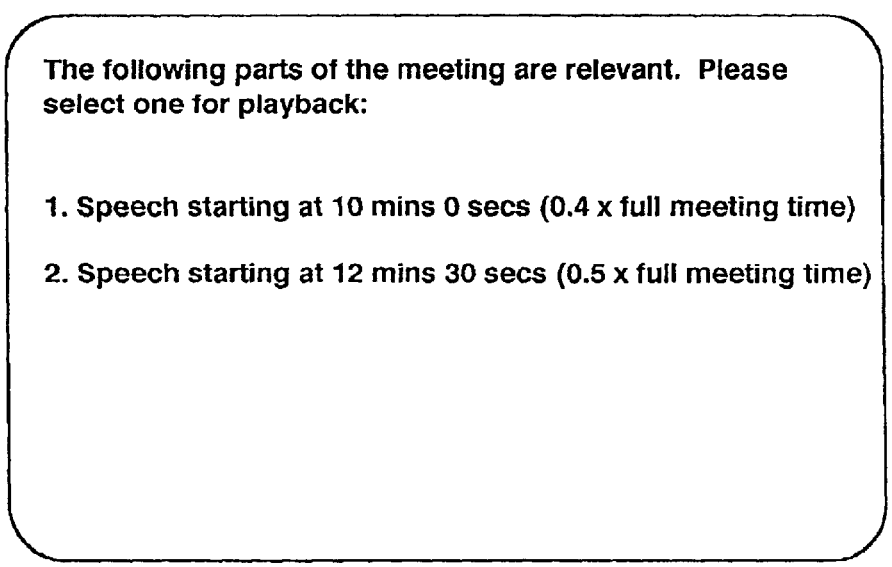
Figure 20:
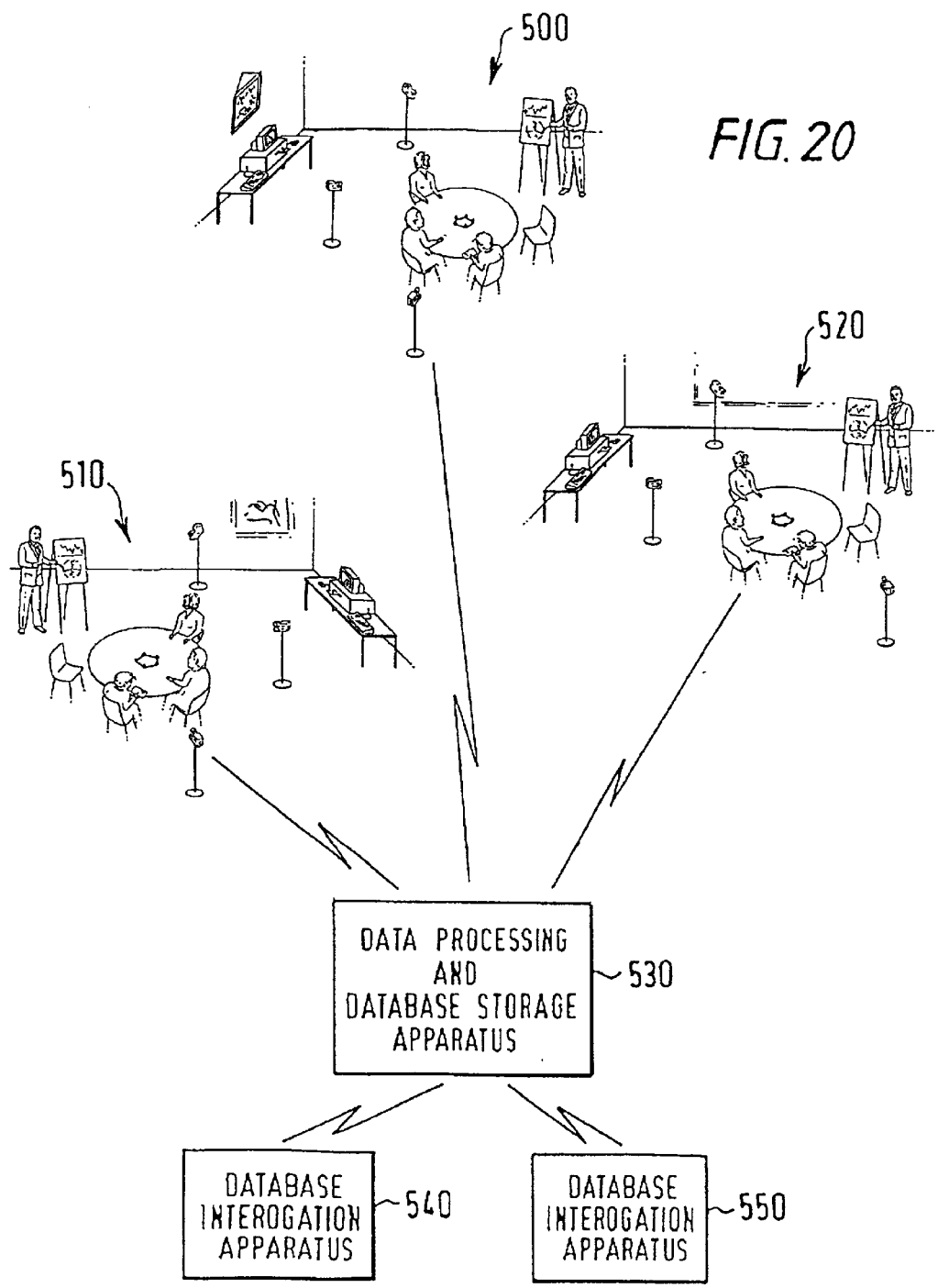

FIG. 4 schematically illustrates the data stored in meeting archive database 60 at step S2 and step S4 in FIG. 3;

FIG. 5 shows the processing operations performed at step S34 in FIG. 3 and step S70 in FIG. 7;

FIG. 6 shows the processing operations performed at each of steps S42-1, S42-2 and S42-n in FIG. 5;

FIG. 7 shows the processing operations performed by processing apparatus 24 in FIG. 2 while the meeting between the participants is taking place;

FIG. 8 shows the processing operations performed at step S72 in FIG. 7;

FIG. 9 shows the processing operations performed at step S80 in FIG. 8;

FIG. 10 illustrates the viewing ray for a participant used in the processing performed at step S114 and step S124 in FIG. 9;

FIG. 11 illustrates the angles calculated in the processing performed at step S114 in FIG. 9;

FIG. 12 shows the processing operations performed at step S84 in FIG. 8;

FIG. 13 shows the processing operations performed at step S89 in FIG. 8;

FIG. 14 shows the processing operations performed at step S168 in FIG. 13;

FIG. 15 schematically illustrates the storage of information in the meeting archive database 60;

FIGS. 16A and 16B show examples of viewing histograms defined by data stored in the meeting archive database 60;

FIG. 17 shows the processing operations performed at step S102 in FIG. 8;

FIG. 18 shows the processing operations performed by processing apparatus 24 to retrieve information from the meeting archive database 60;

FIG. 19A shows the information displayed to a user at step S200 in FIG. 18;

FIG. 19B shows an example of information displayed to a user at step S204 in FIG. 18; and FIG. 20 schematically illustrates an embodiment in which a single database stores information from a plurality of meetings and is interrogated from one or more remote apparatus.

Figure 1:
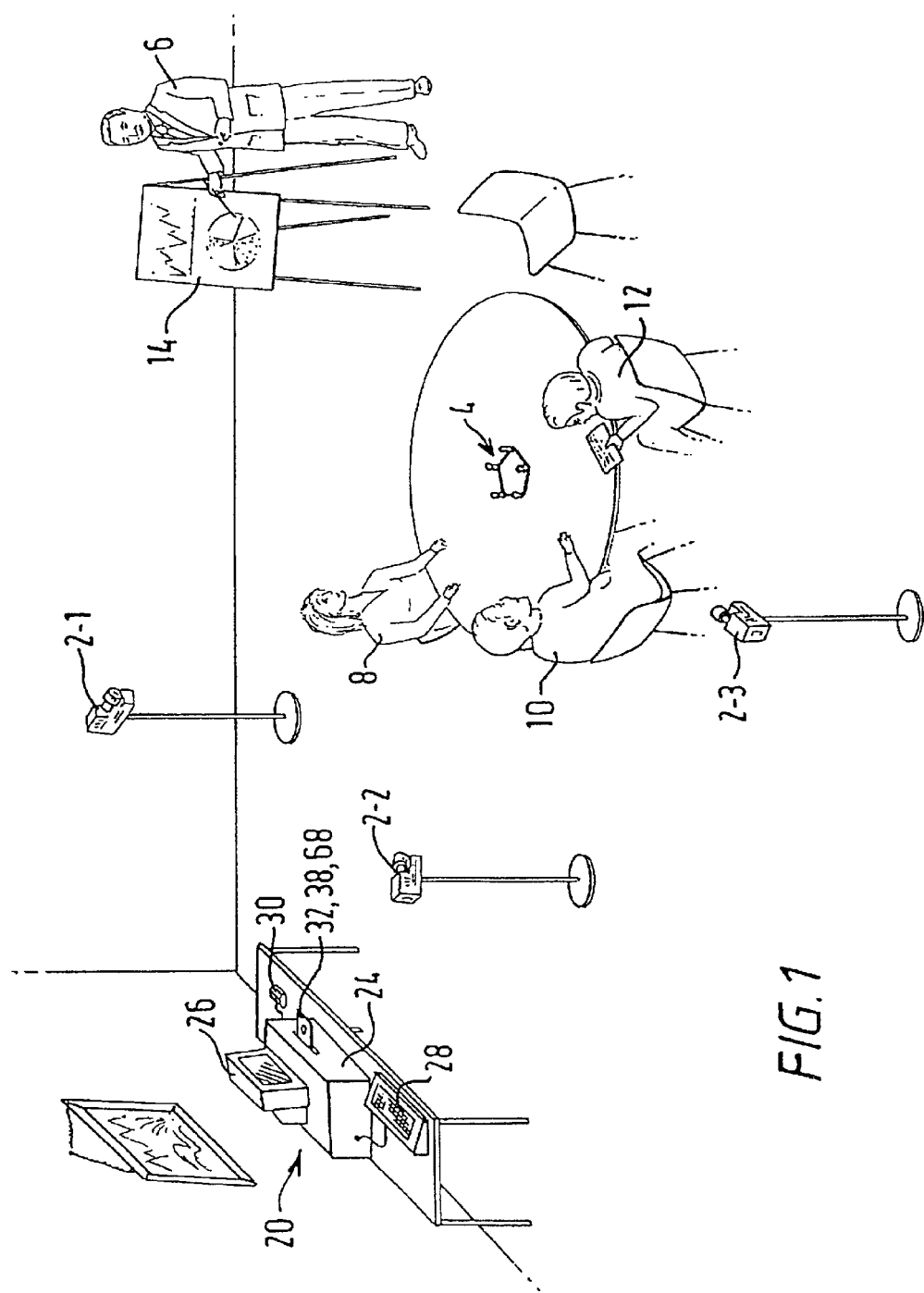
FIG. 1 illustrates the recording of sound and video data from a meeting between a plurality of participants.

Referring to FIG. 1, a plurality of video cameras (three in the example shown in FIG. 1, although this number may be different) 2-1, 2-2, 2-3 and a microphone array 4 are used to record image data and sound data respectively from a meeting taking place between a group of people 6, 8, 10, 12.

The microphone array 4 comprises an array of microphones arranged such that the direction of any incoming sound can be determined, for example as described in GB-A-2140558, U.S. Pat. No. 4,333,170 and U.S. Pat. No. 3,392,392.

The image data from the video cameras 2-1, 2-2, 2-3 and the sound data from the microphone array 4 is input via cables (not shown) to a computer 20 which processes the received data and stores data in a database to create an archive record of the meeting from which information can be subsequently retrieved.

Computer 20 comprises a conventional personal computer having a processing apparatus 24 containing, in a conventional manner, one or more processors, memory, sound card etc., together with a display device 26 and user input devices, which, in this embodiment, comprise a keyboard 28 and a mouse 30.

The components of computer 20 and the input and output of data therefrom are schematically shown in FIG. 2.

Referring to FIG. 2, the processing apparatus 24 is programmed to operate in accordance with programming instructions input, for example, as data stored on a data storage medium, such as disk 32, and/or as a signal 34 input to the processing apparatus 24, for example from a remote database, by transmission over a communication network (not shown) such as the Internet or by transmission through the atmosphere, and/or entered by a user via a user input device such as keyboard 28 or other input device.

When programmed by the programming instructions, processing apparatus 24 effectively becomes configured into a number of functional units for performing processing operations. Examples of such functional units and their interconnections are shown in FIG. 2. The illustrated units and interconnections in FIG. 2 are, however, notional and are shown for illustration purposes only, to assist understanding; they do not necessarily represent the exact units and connections into which the processor, memory etc of the processing apparatus 24 become configured.

Referring to the functional units shown in FIG. 2, a central controller 36 processes inputs from the user input devices 28, 30 and receives data input to the processing apparatus 24 by a user as data stored on a storage device, such as disk 38, or as a signal 40 transmitted to the processing apparatus 24. The central controller 36 also provides control and processing for a number of the other functional units. Memory 42 is provided for use by central controller 36 and other functional units.

Head tracker 50 processes the image data received from video cameras 2-1, 2-2, 2-3 to track the position and orientation in three dimensions of the head of each of the participants 6, 8, 10, 12 in the meeting. In this embodiment, to perform this tracking, head tracker 50 uses data defining a three-dimensional computer model of the head of each of the participants and data defining features thereof, which is stored in head model store 52, as will be described below.

Direction processor 53 processes sound data from the microphone array 4 to determine the direction or directions from which the sound recorded by the microphones was received. Such processing is performed in a conventional manner, for example as described in GB-A-2140558, U.S. Pat. No. 4,333,170 and U.S. Pat. No. 3,392,392.

Voice recognition processor 54 processes sound data received from microphone array 4 to generate text data therefrom. More particularly, voice recognition processor 54 operates in accordance with a conventional voice recognition program, such as "Dragon Dictate" or IBM "ViaVoice", to generate text data corresponding to the words spoken by the participants 6, 8, 10, 12. To perform the voice recognition processing, voice recognition processor 54 uses data defining the speech recognition parameters for each participant 6, 8, 10, 12, which is stored in speech recognition parameter store 56. More particularly, the data stored in speech recognition parameter store 56 comprises data defining the voice profile of each participant which is generated by training the voice recognition processor in a conventional manner. For example, the data comprises the data stored in the "user files" of Dragon Dictate after training.

Archive processor 58 generates data for storage in meeting archive database 60 using data received from head tracker 50, direction processor 53 and voice recognition processor 54. More particularly, as will be described below, video data from cameras 2-1, 2-2 and 2-3 and sound data from microphone array 4 is stored in meeting archive database 60 together with text data from voice recognition processor 54 and data defining at whom each participant in the meeting was looking at a given time.

Text searcher 62, in conjunction with central controller 36, is used to search the meeting archive database 60 to find and replay the sound and video data for one or more parts of the meeting which meet search criteria specified by a user, as will be described in further detail below.

Display processor 64 under control of central controller 36 displays information to a user via display device 26 and also replays sound and video data stored in meeting archive database 60.

Output processor 66 outputs part or all of the data from archive database 60, for example on a storage device such as disk 68 or as a signal 70.

Before beginning the meeting, it is necessary to initialise computer 20 by entering data which is necessary to enable processing apparatus 24 to perform the required processing operations.

FIG. 3 shows the processing operations performed by processing apparatus 24 during this initialisation.

Referring to FIG. 3, at step S1, central controller 36 causes display processor 64 to display a message on display device 26 requesting the user to input the names of each person who will participate in the meeting.

At step S2, upon receipt of data defining the names, for example input by the user using keyboard 28, central controller 36 allocates a unique identification number to each participant, and stores data, for example table 80 shown in FIG. 4, defining the relationship between the identification numbers and the participants' names in the meeting archive database 60.

At step S3, central controller 36 causes display processor 64 to display a message on display device 26 requesting the user to input the name of each object at which a person may look for a significant amount of time during the meeting, and for which it is desired to store archive data in the meeting archive database 60. Such objects may include, for example, a flip chart, such as the flip chart 14 shown in FIG. 1, a whiteboard or blackboard, or a television, etc.

At step S4, upon receipt of data defining the names of the objects, for example input by the user using keyboard 28, central controller 36 allocates a unique identification number to each object, and stores data, for example as in table 80 shown in FIG. 4, defining the relationship between the identification numbers and the names of the objects in the meeting archive database 60.

At step S6, central controller 36 searches the head model store 52 to determine whether data defining a head model is already stored for each participant in the meeting. If it is determined at step S6 that a head model is not already stored for one or more of the participants, then, at step S8, central controller 36 causes display processor 64 to display a message on display device 26 requesting the user to input data defining a head model of each participant for whom a model is not already stored.

In response, the user enters data, for example on a storage medium such as disk 38 or by downloading the data as a signal 40 from a connected processing apparatus, defining the required head models. Such head models may be generated in a conventional manner, for example as described in "An Analysis/Synthesis Cooperation for Head Tracking and Video Face Cloning" by Valente et al in Proceedings ECCV '98 Workshop on Perception of Human Action, University of Freiberg, Germany, Jun. 6, 1998.

At step S10, central controller 36 stores the data input by the user in head model store 52.

At step S12, central controller 36 and display processor 64 render each three-dimensional computer head model input by the user to display the model to the user on display device 26, together with a message requesting the user to identify at least seven features in each model.

In response, the user designates using mouse 30 points in each model which correspond to prominent features on the front, sides and, if possible, the back, of the participant's head, such as the corners of eyes, nostrils, mouth, ears or features on glasses worn by the participant, etc.

At step S14, data defining the features identified by the user is stored by central controller 36 in head model store 52.

On the other hand, if it is determined at step S6 that a head model is already stored in head model store 52 for each participant, then steps S8 to S14 are omitted.

At step S16, central controller 36 searches speech recognition parameter store 56 to determine whether speech recognition parameters are already stored for each participant.

If it is determined at step S16 that speech recognition parameters are not available for all of the participants, then, at step S18, central controller 36 causes display processor 64 to display a message on display device 26 requesting the user to input the speech recognition parameters for each participant for whom the parameters are not already stored.

In response, the user enters data, for example on a storage medium such as disk 38 or as a signal 40 from a remote processing apparatus, defining the necessary speech recognition parameters. As noted above, these parameters define a profile of the user's speech and are generated by training a voice recognition processor in a conventional manner. Thus for example, in the case of a voice recognition processor comprising Dragon Dictate, the speech recognition parameters input by the user correspond to the parameters stored in the "user files" of Dragon Dictate.

At step S20, data defining the speech recognition parameters input by the user is stored by central controller 36 in the speech recognition parameter store 56.

On the other hand, if it is determined at step S16 that the speech recognition parameters are already available for each of the participants, then steps S18 and S20 are omitted.

At step S22, central controller 36 causes display processor 64 to display a message on display device 26 requesting the user to perform steps to enable the cameras 2-1, 2-2 and 2-3 to be calibrated.

In response, the user carries out the necessary steps and, at step S24, central controller 36 performs processing to calibrate the cameras 2-1, 2-2 and 2-3. More particularly, in this embodiment, the steps performed by the user and the processing performed by central controller 36 are carried out in a manner such as that described in "Calibrating and 3D Modelling with a Multi-Camera System" by Wiles and Davison in 1999 IEEE Workshop on Multi-View Modelling and Analysis of Visual Scenes, ISBN 0769501109. This generates calibration data defining the position and orientation of each camera 2-1, 2-2 and 2-3 with respect to the meeting room and also the intrinsic parameters of each camera (aspect ratio, focal length, principal point, and first order radial distortion coefficient). The camera calibration data is stored, for example in memory 42.

At step S25, central controller 36 causes display processor 64 to display a message on display device 26 requesting the user to perform steps to enable the position and orientation of each of the objects for which identification data was stored at step S4 to be determined.

In response, the user carries out the necessary steps and, at step S26, central controller 36 performs processing to determine the position and orientation of each object. More particularly, in this embodiment, the user places coloured markers at points on the perimeter of the surface(s) of the object at which the participants in the meeting may look, for example the plane of the sheets of paper of flip chart 14. Image data recorded by each of cameras 2-1, 2-2 and 2-3 is then processed by central controller 36 using the camera calibration data stored at step S24 to determine, in a conventional manner, the position in three-dimensions of each of the coloured markers. This processing is performed for each camera 2-1, 2-2 and 2-3 to give separate estimates of the position of each coloured marker, and an average is then determined for the position of each marker from the positions calculated using data from each camera 2-1, 2-2 and 2-3. Using the average position of each marker, central controller 36 calculates in a conventional manner the centre of the object surface and a surface normal to define the orientation of the object surface. The determined position and orientation for each object is stored as object calibration data, for example in memory 42.

At step S27, central controller 36 causes display processor 64 to display a message on display device 26 requesting the next participant in the meeting (this being the first participant the first time step S27 is performed) to sit down.

At step S28, processing apparatus 24 waits for a predetermined period of time to give the requested participant time to sit down, and then, at step S30, central controller 36 processes the respective image data from each camera 2-1, 2-2 and 2-3 to determine an estimate of the position of the seated participant's head for each camera. More particularly, in this embodiment, central controller 36 carries out processing separately for each camera in a conventional manner to identify each portion in a frame of image data from the camera which has a colour corresponding to the colour of the skin of the participant (this colour being determined from the data defining the head model of the participant stored in head model store 52), and then selects the portion which corresponds to the highest position in the meeting room (since it is assumed that the head will be the highest skin-coloured part of the body). Using the position of the identified portion in the image and the camera calibration parameters determined at step S24, central controller 36 then determines an estimate of the three-dimensional position of the head in a conventional manner. This processing is performed for each camera 2-1, 2-2 and 2-3 to give a separate head position estimate for each camera.

At step S32, central controller 36 determines an estimate of the orientation of the participant's head in three dimensions for each camera 2-1, 2-2 and 2-3. More particularly, in this embodiment, central controller 36 renders the three-dimensional computer model of the participant's head stored in head model store 52 for a plurality of different orientations of the model to produce a respective two-dimensional image of the model for each orientation. In this embodiment, the computer model of the participant's head is rendered in 108 different orientations to produce 108 respective two-dimensional images, the orientations corresponding to 36 rotations of the head model in 10° steps for each of three head inclinations corresponding to 0° (looking straight ahead), +45° (looking up) and −45° (looking down). Each two-dimensional image of the model is then compared by central processor 36 with the part of the video frame from a camera 2-1, 2-2, 2-3 which shows the participant's head, and the orientation for which the image of the model best matches the video image data is selected, this comparison and selection being performed for each camera to give a head orientation estimate for each camera. When comparing the image data produced by rendering the head model with the video data from a camera, a conventional technique is used, for example as described in "Head Tracking Using a Textured Polygonal Model" by Schödl, Haro & Essa in Proceedings 1998 Workshop on Perceptual User Interfaces.

At step S34, the respective estimates of the position of the participant's head generated at step S30 and the respective estimates of the orientation of the participant's head generated at step S32 are input to head tracker 50 and frames of image data received from each of cameras 2-1, 2-2 and 2-3 are processed to track the head of the participant. More particularly, in this embodiment, head tracker 50 performs processing to track the head in a conventional manner, for example as described in "An Analysis/Synthesis Cooperation for Head Tracking and Video Face Cloning" by Valente et al in Proceedings EECV '98 Workshop on Perception of Human Action, University of Freiberg, Germany, Jun. 6, 1998.

FIG. 5 summarises the processing operations performed by head tracker 50 at step S34.

Referring to FIG. 5, in each of steps S42-1 to S42-n ("n" being three in this embodiment since there are three cameras), head tracker 50 processes image data from a respective one of the cameras recording the meeting to determine the positions of the head features of the participant (stored at step S14) in the image data from the camera and to determine therefrom the three-dimensional position and orientation of the participant's head for the current frame of image data from that camera.

FIG. 6 shows the processing operations performed at a given one of steps S42-1 to S42-$n$, the processing operations being the same at each step but being carried out on image data from a different camera.

Referring to FIG. 6, at step S50, head tracker 50 reads the current estimates of the 3D position and orientation of the participant's head, these being the estimates produced at steps S30 and S32 in FIG. 3 the first time step S50 is performed.

At step S52, head tracker 50 uses the camera calibration data generated at step S24 to render the three-dimensional computer model of the participant's head stored in head model store 52 in accordance with the estimates of position and orientation read at step S50.

At step S54, head tracker 50 processes the image data for the current frame of video data received from the camera to extract the image data from each area which surrounds the expected position of one of the head features identified by the user and stored at step S14, the expected positions being determined from the estimates read at step S50 and the camera calibration data generated at step S24.

At step S56, head tracker 50 matches the rendered image data generated at step S52 and the camera image data extracted at step S54 to find the camera image data which best matches the rendered head model.

At step S58, head tracker 50 uses the camera image data identified at step S56 which best matches the rendered head model together with the camera calibration data stored at step S24 (FIG. 3) to determine the 3D position and orientation of the participant's head for the current frame of video data.

Referring again to FIG. 5, at step S44, head tracker 50 uses the camera image data identified at each of steps S42-1 to S42-$n$ which best matches the rendered head model (identified at step S58 in FIG. 6) to determine an average 3D position and orientation of the participant's head for the current frame of video data.

At the same time that step S44 is performed, at step S46, the positions of the head features in the camera image data determined at each of steps S42-1 to S42-$n$ (identified at step S58 in FIG. 6) are input into a conventional Kalman filter to generate an estimate of the 3D position and orientation of the participant's head for the next frame of video data. Steps S42 to S46 are performed repeatedly for the participant as frames of video data are received from video camera 2-1, 2-2 and 2-3.

Referring again to FIG. 3, at step S36, central controller 36 determines whether there is another participant in the meeting, and steps S27 to S36 are repeated until processing has been performed for each participant in the manner described above. However, while these steps are performed for each participant, at step S34, head tracker 50 continues to track the head of each participant who has already sat down.

When it is determined at step S36 that there are no further participants in the meeting and that accordingly the head of each participant is being tracked by head tracker 50, then, at step S38, central controller 36 causes an audible signal to be output from processing apparatus 24 to indicate that the meeting between the participants can begin.

FIG. 7 shows the processing operations performed by processing apparatus 24 as the meeting between the participants takes place.

Referring to FIG. 7, at step S70, head tracker 50 continues to track the head of each participant in the meeting. The processing performed by head tracker 50 at step S70 is the same as that described above with respect to step S34, and accordingly will not be described again here.

At the same time that head tracker 50 is tracking the head of each participant at step S70, at step S72 processing is performed to generate and store data in meeting archive database 60.

FIG. 8 shows the processing operations performed at step S72.

Referring to FIG. 8, at step S80, archive processor 58 generates a so-called "viewing parameter" for each participant defining at which person or which object the participant is looking.

FIG. 9 shows the processing operations performed at step S80.

Referring to FIG. 9, at step S110, archive processor 58 reads the current three-dimensional position of each participant's head from head tracker 50, this being the average position generated in the processing performed by head tracker 50 at step S44 (FIG. 5).

At step S112, archive processor 58 reads the current orientation of the head of the next participant (this being the first participant the first time step S112 is performed) from head tracker 50. The orientation read at step S112 is the average orientation generated in the processing performed by head tracker 50 at step S44 (FIG. 5).

At step S114, archive processor 58 determines the angle between a ray defining where the participant is looking (a so-called "viewing ray") and each notional line which connects the head of the participant with the centre of the head of another participant.

More particularly, referring to FIGS. 10 and 11, an example of the processing performed at step S114 is illustrated for one of the participants, namely participant 6 in FIG. 1. Referring to FIG. 10, the orientation of the participant's head read at step S112 defines a viewing ray 90 from a point between the centre of the participant's eyes which is perpendicular to the participant's head. Similarly, referring to FIG. 11, the positions of all of the participant's heads read at step S110 define notional lines 92, 94, 96 from the point between the centre of the eyes of participant 6 to the centre of the heads of each of the other participants 8, 10, 12. In the processing performed at step S114, archive processor 58 determines the angles 98, 100, 102 between the viewing ray 90 and each of the notional lines 92, 94, 96.

Referring again to FIG. 9, at step S116, archive processor 58 selects the angle 98, 100 or 102 which has the smallest value. Thus, referring to the example shown in FIG. 11, the angle 100 would be selected.

At step S118, archive processor 58 determines whether the angle selected at step S116 has a value less than 10°.

If it is determined at step S118 that the angle is less than 10°, then, at step S120, archive processor 58 sets the viewing parameter for the participant to the identification number (allocated at step S2 in FIG. 3) of the participant connected by the notional line which makes the smallest angle with the viewing ray. Thus, referring to the example shown in FIG. 11, if angle 100 is less than 10°, then the viewing parameter would be set to the identification number of participant 10 since angle 100 is the angle between viewing ray 90 and notional line 94 which connects participant 6 to participant 10.

On the other hand, if it is determined at step S118 that the smallest angle is not less than 10°, then, at step S122, archive processor 58 reads the position of each object previously stored at step S26 (FIG. 3).

At step S124, archive processor 58 determines whether the viewing ray 90 of the participant intersects the plane of any of the objects.

If it is determined at step S124 that the viewing ray 90 does intersect the plane of an object, then, at step S126, archive processor 50 sets the viewing parameter for the participant to the identification number (allocated at step S4 in FIG. 3) of the object which is intersected by the viewing ray, this being the nearest intersected object to the participant if more than one object is intersected by the viewing ray 90.

On the other hand, if it is determined at step S124 that the viewing ray 90 does not intersect the plane of an object, then, at step S128, archive processor 58 sets the value of the viewing parameter for the participant to "0". This indicates that the participant is determined to be looking at none of the other participants (since the viewing ray 90 is not close enough to any of the notional lines 92, 94, 96) and none of the objects (since the viewing ray 90 does not intersect an object). Such a situation could arise, for example, if the participant was looking at some object in the meeting room for which data had not been stored at step S4 and which had not been calibrated at step S26 (for example the notes held by participant 12 in the example shown in FIG. 1).

At step S130, archive processor 58 determines whether there is another participant in the meeting, and steps S112 to S130 are repeated until the processing described above has been carried out for each of the participants.

Referring again to FIG. 8, at step S82, central controller 36 and voice recognition processor 54 determine whether any speech data has been received from the microphone array 4 corresponding to the current frame of video data.

If it is determined at step S82 that speech data has been received, then, at step S84, processing is performed to determine which of the participants in the meeting is speaking.

FIG. 12 shows the processing operations performed at step S84.

Referring to FIG. 12, at step S140, direction processor 53 processes the sound data from the microphone array 4 to determine the direction or directions from which the speech is coming. This processing is performed in a conventional manner, for example as described in GB-A-2140558, U.S. Pat. No. 4,333,170 and U.S. Pat. No. 3,392,392.

At step S142, archive processor 58 reads the position of each participant's head determined by head tracker 50 at step S44 (FIG. 5) for the current frame of image data and determines therefrom which of the participants has a head at a position corresponding to a direction determined at step S140, that is, a direction from which the speech is coming.

At step S144, archive processor 58 determines whether there is more than one participant in a direction from which the speech is coming.

If it is determined at step S144 that there is only one participant in the direction from which the speech is coming, then, at step S146, archive processor 58 selects the participant in the direction from which the speech is coming as the speaker for the current frame of image data.

On the other hand, if it is determined at step S144 that there is more than one participant having a head at a position which corresponds to the direction from which the speech is coming, then, at step S148, archive processor 58 determines whether one of those participants was identified as the speaker in the preceding frame of image data.

If it is determined at step S148 that one of the participants in the direction from which the speech is coming was selected as the speaker in the preceding frame of image data, then, at step S150, archive processor 58 selects the speaker identified for the previous frame of image data as the speaker for the current frame of image data, too. This is because is it likely that the speaker in the previous frame of image data is the same as the speaker in the current frame.

On the other hand, if it is determined at step S148 that none of the participants in the direction from which the speech is coming is the participant identified as the speaker in the preceding frame, or if no speaker was identified for the previous frame, then, at step S152, archive processor 58 selects each of the participants in the direction from which the speech is coming as a "potential" speaking participant.

Referring again to FIG. 8, at step S86, archive processor 58 stores the viewing parameter value for each speaking participant, that is the viewing parameter value generated at step S80 defining at whom or what each speaking participant is looking, for subsequent analysis, for example in memory 42.

At step S88, archive processor 58 informs voice recognition processor 54 of the identity of each speaking participant determined at step S84. In response, voice recognition processor 54 selects the speech recognition parameters for the speaking participant(s) from speech recognition parameter store 56 and uses the selected parameters to perform speech recognition processing on the received speech data to generate text data corresponding to the words spoken by the speaking participant(s).

On the other hand, if it is determined at step S82 that the received sound data does not contain any speech, then steps S84 to S88 are omitted.

At step S89, archive processor 58 determines which image data is to be stored in the meeting archive database 60, that is, the image data from which of the cameras 2-1, 2-2 and 2-3 is to be stored.

FIG. 13 shows the processing operations performed by archive processor 58 at step S89.

Referring to FIG. 13, at step S160, archive processor 58 determines whether any speech was detected at step S82 (FIG. 8) for the current frame of image data.

If it is determined at step S160 that there is no speech for the current frame, then, at step S162, archive processor 58 selects a default camera as the camera from which image data is to be stored. More particularly, in this embodiment, archive processor 58 selects the camera or cameras from which image data was recorded for the previous frame, or, if the current frame being processed is the very first frame, then archive processor 58 selects one of the cameras 2-1, 2-2, 2-3 at random.

On the other hand, if it is determined at step S160 that there is speech for the current frame being processed then, at step S164, archive processor 58 reads the viewing parameter previously stored at step S86 for the next speaking participant (this being the first speaking participant the first time step S164 is performed) to determine the person or object at which that speaking participant is looking.

At step S166, archive processor 58 reads the head position and orientation (determined at step S44 in FIG. 5) for the speaking participant currently being considered, together with the head position and orientation of the participant at which the speaking participant is looking (determined at step S44 in FIG. 5) or the position and orientation of the object at which the speaking participant is looking (stored at step S26 in FIG. 3).

At step S168 archive processor 58 processes the positions and orientations read at step S166 to determine which of the cameras 2-1, 2-2, 2-3 best shows both the speaking participant and the participant or object at which the speaking participant is looking, and selects this camera as a camera from which image data for the current frame is to be stored in meeting archive database 60.

FIG. 14 shows the processing operations performed by archive processor 58 at step S168.

Referring to FIG. 14, at step S176, archive processor 58 reads the three-dimensional position and viewing direction of the next camera (this being the first camera the first time step S176 is performed), this information having previously been generated and stored at step S24 in FIG. 3.

At step S178, archive processor 58 uses the information read at step S176 together with information defining the three-dimensional head position and orientation of the speaking participant (determined at step S44 in FIG. 5) and the three-dimensional head position and orientation of the participant at whom the speaking participant is looking (determined at step S44 in FIG. 5) or the three-dimensional position and orientation of the object being looked at (stored at step S26 in FIG. 3) to determine whether the speaking participant and the participant or object at which the speaking participant is looking are both within the field of view of the camera currently being considered (that is, whether the camera currently being considered can see both the speaking participant and the participant or object at which the speaking participant is looking). More particularly, in this embodiment, archive processor 58 evaluates the following equations and determines that the camera can see both the speaking participant and the participant or object at which the speaking participant is looking if all of the inequalities hold:

$$\left| \arccos \left[ \frac{1}{\sqrt{(X_{p1} - X_c)^2 + (Y_{p1} - Y_c)^2}} \begin{pmatrix} X_{p1} - X_c \\ Y_{p1} - Y_c \end{pmatrix} \cdot \begin{pmatrix} dX_c \\ dY_c \end{pmatrix} \right] \right| < \theta_h \quad (1)$$

$$\left| \arccos \left[ \frac{1}{\sqrt{(X_{p1} - X_c)^2 + (Y_{p1} - Y_c)^2 + (Z_{p1} - Z_c)^2}} \begin{pmatrix} X_{p1} - X_c \\ Y_{p1} - Y_c \\ Z_{p1} - Z_c \end{pmatrix} \cdot \begin{pmatrix} dX_c \\ dY_c \\ dZ_c \end{pmatrix} \right] \right| < \theta_v \quad (2)$$

$$\left| \arccos \left[ \frac{1}{\sqrt{(X_{p2} - X_c)^2 + (Y_{p2} - Y_c)^2}} \begin{pmatrix} X_{p2} - X_c \\ Y_{p2} - Y_c \end{pmatrix} \cdot \begin{pmatrix} dX_c \\ dY_c \end{pmatrix} \right] \right| < \theta_h \quad (3)$$

$$\left| \arccos \left[ \frac{1}{\sqrt{(X_{p2} - X_c)^2 + (Y_{p2} - Y_c)^2 + (Z_{p2} - Z_c)^2}} \begin{pmatrix} X_{p2} - X_c \\ Y_{p2} - Y_c \\ Z_{p2} - Z_c \end{pmatrix} \cdot \begin{pmatrix} dX_c \\ dY_c \\ dZ_c \end{pmatrix} \right] \right| < \theta_v \quad (4)$$

where:
- $(X_c, Y_c, Z_c)$ are the x, y and z coordinates respectively of the principal point of the camera (previously determined and stored at step S24 in FIG. 3)
- $(dX_c, dY_c, dZ_c)$ represent the viewing direction of the camera in the x, y and z directions respectively (again determined and stored at step S24 in FIG. 3)
- $\theta_h$ and $\theta_v$ are the angular fields of view of the camera in the horizontal and vertical directions respectively (again determined and stored at step S24 in FIG. 3)
- $(X_{p1}, Y_{p1}, Z_{p1})$ are the x, y and z coordinates respectively of the centre of the head of the speaking participant (determined at step S44 in FIG. 5)
- $(dX_{p1}, dY_{p1}, dZ_{p1})$ represent the orientation of the viewing ray 90 of the speaking participant (again determined at step S44 in FIG. 5)
- $(X_{p2}, Y_{p2}, Z_{p2})$ are the x, y and z coordinates respectively of the centre of the head of the person at whom the speaking participant is looking (determined at step S44 in FIG. 5) or of the centre of the surface of the object at which the speaking participant is looking (determined at step S26 in FIG. 3)
- $(dX_{p2}, dY_{p2}, dZ_{p2})$ represent the direction in the x, y and z directions respectively of the viewing ray 90 of the participant at whom the speaking participant is looking (again determined at step S44 in FIG. 5) or of the normal to the object surface at which the speaking participant is looking (determined at step S26 in FIG. 3).

If it is determined at step S178 that the camera can see both the speaking participant and the participant or object at which the speaking participant is looking (that is, the inequalities in each of equations (1), (2), (3) and (4) above hold), then, at step S180, archive processor 58 calculates and stores a value representing the quality of the view that the camera currently being considered has of the speaking participant. More particularly, in this embodiment, archive processor 58 calculates a quality value, Q1, using the following equation:

$$Q1 = \frac{1}{\sqrt{(X_c - X_{p1})^2 + (Y_c - Y_{p1})^2 + (Z_c - Z_{p1})^2}} \begin{pmatrix} X_c - X_{p1} \\ Y_c - Y_{p1} \\ Z_c - Z_{p1} \end{pmatrix} \cdot \begin{pmatrix} dX_{p1} \\ dY_{p1} \\ dZ_{p1} \end{pmatrix} \quad (5)$$

where the definitions of the terms are the same as those given for equations (1) and (2) above.

The quality value, Q1, calculated at step S180 is a scalar, having a value between −1 and +1, with the value being −1 if the back of the speaking participant's head is directly facing the camera, +1 if the face of the speaking participant is directly facing the camera, and a value in-between for other orientations of the speaking participant's head.

At step S182, archive processor 58 calculates and stores a value representing the quality of the view that the camera currently being considered has of the participant or object at which the speaking participant is looking. More particularly, in this embodiment, archive processor 58 calculates a quality value, Q2, using the following equation:

$$Q2 = \frac{1}{\sqrt{(X_c - X_{p2})^2 + (Y_c - Y_{p2})^2 + (Z_c - Z_{p2})^2}} \begin{pmatrix} X_c - X_{p2} \\ Y_c - Y_{p2} \\ Z_c - Z_{p2} \end{pmatrix} \cdot \begin{pmatrix} dX_{p2} \\ dY_{p2} \\ dZ_{p2} \end{pmatrix} \quad (6)$$

where the definitions of the parameters are the same as those given for equations (3) and (4) above.

Again, Q2 is a scalar having a value between −1 if the back of the head of the participant or the back of the surface of the object is directly facing the camera, +1 if the face of the participant or the front surface of the object is directly facing the camera, and values therebetween for other orientations of the participant's head or object surface.

At step S184, archive processor 58 compares the quality value Q1 calculated at step S180 with the quality value Q2 calculated at step S182, and selects the lowest value.

This lowest value indicates the "worst view" that the camera has of the speaking participant or the participant or object at which the speaking participant is looking, (the worst view being that of the speaking participant if Q1 is less than Q2, and that of the participant or object at which the speaking participant is looking if Q2 is less than Q1).

On the other hand, if it is determined at step S178 that one or more of the equalities in equations (1), (2), (3) and (4)

does not hold (that is, the camera can not see both the speaking participant and the participant or object at which the speaking participant is looking), then, steps S180 to S184 are omitted.

At step S186, archive processor 58 determines whether there is another camera from which image data has been received. Steps S176 to S186 are repeated until the processing described above has been performed for each camera.

At step S188, archive processor 58 compares the "worst view" values stored for each of the cameras when processing was performed at step S184 (that is, the value of Q1 or Q2 stored for each camera at step S184) and selects the highest one of these stored values. This highest value represents the "best worst view" and accordingly, at step S188, archive processor 58 selects the camera for which this "best worst view" value was stored at step S184 as a camera from which image data should be stored in the meeting archive database, since this camera has the best view of both the speaking participant and the participant or object at which the speaking participant is looking.

At step S170, archive processor 58 determines whether there is another speaking participant, including any "potential" speaking participants. Steps S164 to S170 are repeated until the processing described above has been performed for each speaking participant and each "potential" speaking participant.

Referring again to FIG. 8, at step S90, archive processor 58 encodes the current frame of video data received from the camera or cameras selected at step S89 and the sound data received from microphone array 4 as MPEG 2 data in a conventional manner, and stores the encoded data in meeting archive database 60.

FIG. 15 schematically illustrates the storage of data in meeting archive database 60. The storage structure shown in FIG. 15 is notional and is provided to assist understanding by illustrating the links between the stored information; it does not necessarily represent the exact way in which data is stored in the memory comprising meeting archive database 60.

Referring to FIG. 15, meeting archive database 60 stores time information represented by the horizontal axis 200, on which each unit represents a predetermined amount of time, for example the time period of one frame of video data received from a camera. (It will, of course, be appreciated that the meeting archive database 60 will generally contain many more time units than the number shown in FIG. 15.) The MPEG 2 data generated at step S90 is stored as data 202 in meeting archive database 60, together with timing information (this timing information being schematically represented in FIG. 15 by the position of the MPEG 2 data 202 along the horizontal axis 200).

Referring again to FIG. 8, at step S92, archive processor 58 stores any text data generated by voice recognition processor 54 at step S88 for the current frame in meeting archive database 60 (indicated at 204 in FIG. 15). More particularly, the text data is stored with a link to the corresponding MPEG 2 data, this link being represented in FIG. 15 by the text data being stored in the same vertical column as the MPEG 2 data.

As will be appreciated, there will not be any text data for storage from participants who are not speaking. In the example shown in FIG. 15, text is stored for the first ten time slots for participant 1 (indicated at 206), for the twelfth to twentieth time slots for participant 3 (indicated at 208), and for the twenty-first time slot for participant 4 (indicated at 210). No text is stored for participant 2 since, in this example, participant 2 did not speak during the time slots shown in FIG. 15.

At step S94, archive processor 58 stores the viewing parameter value generated for the current frame for each participant at step S80 in the meeting archive database 60 (indicated at 212 in FIG. 15). Referring to FIG. 15, a viewing parameter value is stored for each participant together with a link to the associated MPEG 2 data 202 and the associated text data 204 (this link being represented in FIG. 15 by the viewing parameter values being shown in the same column as the associated MPEG 2 data 202 and associated text data 204). Thus, referring to the first time slot in FIG. 15 by way of example, the viewing parameter value for participant 1 is 3, indicating that participant 1 is looking at participant 3, the viewing parameter value for participant 2 is 5, indicating that participant 2 is looking at the flip chart 14, the viewing parameter value for participant 3 is 1, indicating that participant 3 is looking at participant 1, and the viewing parameter value for participant 4 is "0", indicating that participant 4 is not looking at any of the other participants (in the example shown in FIG. 1, the participant indicated at 12 is looking at her notes rather than any of the other participants).

At step S96, central controller 36 and archive processor 58 determine whether one of the participants in the meeting has stopped speaking. In this embodiment, this check is performed by examining the text data 204 to determine whether text data for a given participant was present for the previous time slot, but is not present for the current time slot. If this condition is satisfied for any participant (that is, a participant has stopped speaking), then, at step S98, archive processor 58 processes the viewing parameter values previously stored when step S86 was performed for each participant who has stopped speaking (these viewing parameter values defining at whom or what the participant was looking during the period of speech which has now stopped) to generate data defining a viewing histogram. More particularly, the viewing parameter values for the period in which the participant was speaking are processed to generate data defining the percentage of time during that period that the speaking participant was looking at each of the other participants and objects.

FIGS. 16A and 16B show the viewing histograms corresponding to the periods of text 206 and 208 respectively in FIG. 15.

Referring to FIG. 15 and FIG. 16A, during the period 206 when participant 1 was speaking, he was looking at participant 3 for six of the ten time slots (that is, 60% of the total length of the period for which he was talking), which is indicated at 300 in FIG. 16A, and at participant 4 for four of the ten time slots (that is, 40% of the time), which is indicated at 310 in FIG. 16A.

Similarly, referring to FIG. 15 and FIG. 16B, during the period 208, participant 3 was looking at participant 1 for approximately 45% of the time, which is indicated at 320 in FIG. 16B, at object 5 (that is, the flip chart 14) for approximately 33% of the time, indicated at 330 in FIG. 16B, and at participant 2 for approximately 22% of the time, which is indicated at 340 in FIG. 16B.

Referring again to FIG. 8, at step S100, each viewing histogram generated at step S98 is stored in the meeting archive database 60 linked to the associated period of text for which it was generated. Referring to FIG. 15, the stored viewing histograms are indicated at 214, with the data defining the histogram for the text period 206 indicated at 216, and the data defining the histogram for the text period 208 indicated at 218. In FIG. 15, the link between the viewing histogram and the associated text is represented by the viewing histogram being stored in the same columns as the text data.

On the other hand, if it is determined at step S96 that, for the current time period, one of the participants has not stopped speaking, then steps S98 and S100 are omitted.

At step S102, archive processor 58 corrects data stored in the meeting archive database 60 for the previous frame of video data (that is, the frame preceding the frame for which data has just been generated and stored at steps S80 to S100) and other preceding frames, if such correction is necessary.

FIG. 17 shows the processing operations performed by archive processor 58 at step S102.

Referring to FIG. 17, at step S190, archive processor 58 determines whether any data for a "potential" speaking participant is stored in the meeting archive database 60 for the next preceding frame (this being the frame which immediately precedes the current frame the first time step S190 is performed, that is the "i–1"th frame if the current frame is the "i"th frame).

If it is determined at step S190 that no data is stored for a "potential" speaking participant for the preceding frame being considered, then it is not necessary to correct any data in the meeting archive database 60.

On the other hand, if it is determined at step S190 that data for a "potential" speaking participant is stored for the preceding frame being considered, then, at step S192, archive processor 58 determines whether one of the "potential" speaking participants for which data was stored for the preceding frame is the same as a speaking participant (but not a "potential" speaking participant) identified for the current frame, that is a speaking participant identified at step S146 in FIG. 12.

If it is determined at step S192 that none of the "potential" speaking participants for the preceding frame is the same as a speaking participant identified at step S146 for the current frame, then no correction of the data stored in the meeting archive database 60 for the preceding frame being considered is carried out.

On the other hand, if it is determined at step S192 that a "potential" speaking participant for the preceding frame is the same as a speaking participant identified at step S146 for the current frame, then, at step S194, archive processor 58 deletes the text data 204 for the preceding frame being considered from the meeting archive ? database 60 for each "potential" speaking participant who is not the same as the speaking participant for the current frame.

By performing the processing at steps S190, S192 and S194 as described above, when a speaker is positively identified by processing image and sound data for the current frame, then data stored for the previous frame for "potential" speaking participants (that is, because it was not possible to unambiguously identify the speaker) is updated using the assumption that the speaker in the current frame is the same as the speaker in the preceding frame.

After step S194 has been performed, steps S190 to S194 are repeated for the next preceding frame. More particularly, if the current frame is the "i"th frame then, the "i–1"th frame is considered the first time steps S190 to S194 are performed, the "i–2"th frame is considered the second time steps S190 to S194 are performed, etc. Steps S190 to S194 continue to be repeated until it is determined at step S190 that data for "potential" speaking participants is not stored in the preceding frame being considered or it is determined at step S192 that none of the "potential" speaking participants in the preceding frame being considered is the same as a speaking participant unambiguously identified for the current frame. In this way, in cases where "potential" speaking participants were identified for a number of successive frames, the data stored in the meeting archive database is corrected if the actual speaking participant from among the "potential" speaking participants is identified in the next frame.

Referring again to FIG. 8, at step S104, central controller 36 determines whether another frame of video data has been received from the cameras 2-1, 2-2, 2-3.

Steps S80 to S104 are repeatedly performed while image data is received from the cameras 2-1, 2-2, 2-3.

When data is stored in meeting archive database 60, then the meeting archive database 60 may be interrogated to retrieve data relating to the meeting.

FIG. 18 shows the processing operations performed to search the meeting archive database 60 to retrieve data relating to each part of the meeting which satisfies search criteria specified by a user.

Referring to FIG. 18, at step S200, central controller 36 causes display processor 64 to display a message on display device 26 requesting the user to enter information defining the search of meeting archive database 60 which is required. More particularly, in this embodiment, central controller 100 causes the display shown in FIG. 19A to appear on display device 26.

Referring to FIG. 19A, the user is requested to enter information defining the part or parts of the meeting which he wishes to find in the meeting archive database 60. More particularly, in this embodiment, the user is requested to enter information 400 defining a participant who was talking, information 410 comprising one or more key words which were said by the participant identified in information 400, and information 420 defining the participant or object at which the participant identified in information 400 was looking when he was talking. In addition, the user is able to enter time information defining a portion or portions of the meeting for which the search is to be carried out. More particularly, the user can enter information 430 defining a time in the meeting beyond which the search should be discontinued (that is, the period of the meeting before the specified time should be searched), information 440 defining a time in the meeting after which the search should be carried out, and information 450 and 460 defining a start time and end time respectively between which the search is to be carried out. In this embodiment, information 430, 440, 450 and 460 may be entered either by specifying a time in absolute terms, for example in minutes, or in relative terms by entering a decimal value which indicates a proportion of the total meeting time. For example, entering the value 0.25 as information 430 would restrict the search to the first quarter of the meeting.

In this embodiment, the user is not required to enter all of the information 400, 410 and 420 for one search, and instead may omit one or two pieces of this information. If the user enters all of the information 400, 410 and 420, then the search will be carried out to identify each part of the meeting in which the participant identified in information 400 was talking to the participant or object identified in information 420 and spoke the key words defined in information 410. On the other hand, if information 410 is omitted, then a search will be carried out to identify each part of the meeting in which the participant defined in information 400 was talking to the participant or object defined in information 420 irrespective of what was said. If information 410 and 420 is omitted, then a search is carried out to identify each part of the meeting in which the participant defined in information 400 was talking, irrespective of what was said and to whom. If information 400 is omitted, then a search is carried out to identify each part of the meeting in which any of the participants spoke the key words defined in information 410 while looking at the participant or object defined in information 420. If information 400 and 410 is omitted, then a search is carried out to identify each part of the meeting in which any of the participants spoke to the participant or object defined in information 420. If information 420 is omitted, then a search is carried out to identify each part of the meeting in which the participant defined in information 400 spoke the key words defined in information 410, irrespective of to whom the key words were spoken. Similarly, if information 400 and 420 is omitted, then a search is carried out to identify each part of the meeting in which the key words identified in information 410 were spoken, irrespective of who said the key words and to whom.

In addition, the user may enter all of the time information 430, 440, 450 and 460 or may omit one or more pieces of this information.

Further, known Boolean operators and search algorithms may be used in combination with key words entered in information 410 to enable the searcher to search for combinations or alternatives of words.

Once the user has entered all of the required information to define the search, he begins the search by clicking on area 470 using a user input device such as the mouse 30.

Referring again to FIG. 18, at step S202, the search information entered by the user is read by central controller 36 and the instructed search is carried out. More particularly, in this embodiment, central controller 36 converts any participant or object names entered in information 400 or 420 to identification numbers using the table 80 (FIG. 4), and considers the text information 204 for the participant defined in information 400 (or all participants if information 400 is not entered). If information 420 has been entered by the user, then, for each period of text, central controller 36 checks the data defining the corresponding viewing histogram to determine whether the percentage of viewing time in the histogram for the participant or object defined in information 420 is equal to or above a threshold, which, in this embodiment, is 25%. In this way, periods of speech (text) are considered to satisfy the criteria that a participant defined in information 400 was talking to the participant or object defined in information 420 even if the speaking participant looked at other participants or objects while speaking, provided that the speaking participant looked at the participant or object defined in information 420 for at least 25% of the time of the speech. Thus, for example, a period of speech in which the value of the viewing histogram is equal to or above 25% for two or more participants would be identified if any of these participants were specified in information 420. If the information 410 has been input by the user, then central controller 36 and text searcher 62 search each portion of text previously identified on the basis of information 400 and 420 (or all portions of text if information 400 and 420 was not entered) to identify each portion containing the key word(s) identified in information 410. If any time information has been entered by the user, then the searches described above are restricted to the meeting times defined by those limits.

At step S204, central controller 36 causes display processor 64 to display a list of relevant speeches identified during the search to the user on display device 26. More particularly, central controller 36 causes information such as that shown in FIG. 19B to be displayed to the user. Referring to FIG. 19B, a list is produced of each speech which satisfies the search parameters, and information is displayed defining the start time for the speech both in absolute terms and as a proportion of the full meeting time. The user is then able to select one of the speeches for playback, for example by clicking on the required speech in the list using the mouse 30.

At step S206, central controller 36 reads the selection made by the user at step S204, and plays back the stored MPEG 2 data 202 for the relevant part of the meeting from meeting archive database 60. More particularly, central controller 36 and display processor 64 decode the MPEG 2 data 202 and output the image data and sound via display device 26. If image data from more than one camera is stored for part, or the whole, of the speech to be played back, then this is indicated to the user on display device 26 and the user is able to select the image data which is to be replayed by inputting instructions to central controller 36, for example using keyboard 28.

At step S208, central controller 36 determines whether the user wishes to cease interrogating the meeting archive database 60 and, if not, steps S200 to S208 are repeated.

Various modifications and changes can be made to the embodiment of the invention described above.

For example, in the embodiment above a microphone array 4 is provided on the meeting room table to determine the direction from which received sound has come. However, instead, a respective microphone may be provided for each participant in the meeting (such as a microphone which attaches to the clothing of the participant). In this way, the speaking participants) can be readily identified because the sound data for the participants is input into processing apparatus 24 on respective channels.

In the embodiment above, at step S34 (FIG. 3) and step S70 (FIG. 7) the head of each of the participants in the meeting is tracked. In addition, however, objects for which data was stored at step S4 and S26 could also be tracked if they moved (such objects may comprise, for example, notes which are likely to be moved by a participant or an object which is to be passed between the participants).

In the embodiment above, at step S168 (FIG. 13), processing is performed to identify the camera which has the best view of the speaking participant and also the participant or object at which the speaking participant is looking. However, instead of identifying the camera in the way described in the embodiment above, it is possible for a user to define during the initialisation of processing apparatus 24 which of the cameras 2-1, 2-2, 2-3 has the best view of each respective pair of the seating positions around the meeting table and/or the best view of each respective seating position and a given object (such as flip chart 14). In this way, if it is determined that the speaking participant and the participant at whom the speaking participant is looking are in predefined seating positions, then the camera defined by the user to have the best view of those predefined seating positions can be selected as a camera from which image data is to be stored. Similarly, if the speaking participant is in a predefined position and is looking at an object, then the camera defined by the user to have the best view of that predefined seating position and object can be selected as the camera from which image data is to be stored.

In the embodiment above, at step S162 (FIG. 13) a default camera is selected as a camera from which image data was stored for the previous frame. Instead, however, the default camera may be selected by a user, for example during the initialisation of processing apparatus 24.

In the embodiment above, at step S194 (FIG. 17), the text data 204 is deleted from meeting archive database 60 for the "potential" speaking participants who have now been identified as actually not being speaking participants. In addition, however, the associated viewing histogram data 214 may also be deleted. In addition, if MPEG 2 data 202 from more than one of the cameras 2-1, 2-2, 2-3 was stored, then the MPEG 2 data related to the "potential" speaking participants may also be deleted.

In the embodiment above, when it is not possible to uniquely identify a speaking participant, "potential" speaking participants are defined, data is processed and stored in meeting archive database 60 for the potential speaking participants, and subsequently the data stored in the meeting archive database 60 is corrected (step S102 in FIG. 8). However, instead, rather than processing and storing data for "potential" speaking participants, video data received from cameras 2-1, 2-2 and 2-3 and audio data received from microphone array 4 may be stored for subsequent processing and archiving when the speaking participant has been identified from data relating to a future frame. Alternatively, when the processing performed at step S114 (FIG. 12) results in an indication that there is more than one participant in the direction from which the speech is coming, image data from the cameras 2-1, 2-2 and 2-3 may be processed to detect lip movements of the participants and to select as the speaking participant the participant in the direction from which the speech is coming whose lips are moving.

In the embodiment above, processing is performed to determine the position of each person's head, the orientation of each person's head and a viewing parameter for each person defining at whom or what the person is looking. The viewing parameter value for each person is then stored in the meeting archive database 60 for each frame of image data. However, it is not necessary to determine a viewing parameter for all of the people. For example, it is possible to determine a viewing parameter for just the speaking participant, and to store just this viewing parameter value in the meeting archive database 60 for each frame of image data. Accordingly, in this case, it would be necessary to determine the orientation of only the speaking participant's head. In this way, processing requirements and storage requirements can be reduced.

In the embodiment above, at step S202 (FIG. 18), the viewing histogram for a particular portion of text is considered and it is determined that the participant was talking to a further participant or object if the percentage of gaze time for the further participant or object in the viewing histogram is equal to or above a predetermined threshold. Instead, however, rather than using a threshold, the participant or object at whom the speaking participant was looking during the period of text (speech) may be defined to be the participant or object having the highest percentage gaze value in the viewing histogram (for example participant 3 in FIG. 16A, and participant 1 in FIG. 16B).

In the embodiment above, the MPEG 2 data 202, the text data 204, the viewing parameters 212 and the viewing histograms 214 are stored in meeting archive database 60 in real time as data is received from cameras 2-1, 2-2 and 2-3 and microphone array 4. However, instead, the video and sound data may be stored and data 202, 204, 212 and 214 generated and stored in meeting archive database 60 in non-real-time.

In the embodiment above, the MPEG 2 data 202, the text data 204, the viewing parameters 212 and the viewing histograms 214 are generated and stored in the meeting archive database 60 before the database is interrogated to retrieve data for a defined part of the meeting. However, some, or all, of the viewing histogram data 214 may be generated in response to a search of the meeting archive database 60 being requested by the user by processing the data already stored in meeting archive database 60, rather than being generated and stored prior to such a request. For example, although in the embodiment above the viewing histograms 214 are calculated and stored in real-time at steps S98 and S100 (FIG. 8), these histograms could be calculated in response to a search request being input by the user.

In the embodiment above, text data 204 is stored in meeting archive database 60. Instead, audio data may be stored in the meeting archive database 60 instead of the text data 204. The stored audio data would then either itself be searched for key words using voice recognition processing or converted to text using voice recognition processing and the text search using a conventional text searcher.

In the embodiment above, processing apparatus 24 includes functional components for receiving and generating data to be archived (for example, central controller 36, head tracker 50, head model store 52, direction processor 53, voice recognition processor 54, speech recognition parameter store 56 and archive processor 58), functional components for storing the archive data (for example meeting archive database 60), and also functional components for searching the database and retrieving information therefrom (for example central controller 36 and text searcher 62). However, these functional components may be provided in separate apparatus. For example, one or more apparatus for generating data to be archived, and one or more apparatus for database searching may be connected to one or more databases via network, such as the Internet.

Also, referring to FIG. 20, video and sound data from one or more meetings 500, 510, 520 may be input to a data processing and database storage apparatus 530 (which comprises functional components to generate and store the archive data), and one or more database interrogation apparatus 540, 550 may be connected to the data processing and database storage apparatus 530 for interrogating the database to retrieve information therefrom.

In the embodiment above, processing is performed by a computer using processing routines defined by programming instructions. However, some, or all, of the processing could be performed using hardware.

Although the embodiment above is described with respect to a meeting taking place between a number of participants, the invention is not limited to this application, and, instead, can be used for other applications, such as to process image and sound data on film set etc.

Different combinations of the above modifications are, of course, possible and other changes and modifications can be made without departing from the spirit and scope of the invention.

The contents of the assignee's co-pending PCT application PCT/GB00/00718 filed on 01 Mar. 2000 and designating, inter alia, the United States of America as a designated state, and the contents of the assignee's co-pending U.S. application Ser. No. 09/519,178; CFP 1194 US) filed on 6 Mar. 2000 are hereby incorporated by reference.

What is claimed is:

1. Image processing apparatus, comprising:

an image data receiver for receiving image data recorded by a plurality of cameras showing the movements of a plurality of people;

a speaker identifier for determining which of the people is speaking;

a speech recipient identifier for determining at whom the speaker is looking;

a position calculator for determining the position of the speaker and the position of the person at whom the speaker is looking; and camera selection means for selecting image data from the received image data on the basis of the determined positions of the speaker and the person at whom the speaker is looking, said camera selection means being arranged to select image data in which both the speaker and the person at whom the speaker is looking appear, and wherein the camera selection means is arranged to generate quality values representing a quality of the views that at least some of the cameras have of the speaker and the person at whom the speaker is looking, and to select the image data on the basis of which camera has the quality value representing the highest quality.

2. Apparatus according to claim 1, wherein the camera selection means is arranged to determine which of the cameras have a view of the speaker and the person at whom the speaker is looking, and to generate a respective quality value for each camera which has a view of the speaker and the person at whom the speaker is looking.

3. Apparatus according to claim 1, wherein the camera selection means is arranged to generate each quality value in dependence upon the position and orientation of the head of the speaker and the position and orientation of the head of the person at whom the speaker is looking.

4. Apparatus according to claim 1, wherein the camera selection means comprises:

a data store for storing data defining a camera from which image data is to be selected for respective pairs of positions; and an image data selector arranged to use data stored in the data store to select the image data in dependence upon the positions of the speaker and the person at whom the speaker is looking.

5. Apparatus according to claim 1, wherein the speech recipient identifier and the position calculator comprise an image processor for processing the image data from at least one of the cameras to determine at whom the speaker is looking and the positions.

6. Apparatus according to claim 5, wherein the image processor is arranged to determine the position of each person and at whom each person is looking by processing the image data from the at least one camera.

7. Apparatus according to claim 5, wherein the image processor is arranged to track the position and orientation of each person's head in three dimensions.

8. Apparatus according to claim 1, wherein the speaker identifier is arranged to receive speech data from a plurality of microphones each of which is allocated to a respective one of the people, and to determine which of the people is speaking on the basis of the microphone from which the speech data was received.

9. Apparatus according to claim 1, further comprising a sound processor for processing sound data defining words spoken by the people to generate text data therefrom in dependence upon the result of the processing performed by the speaker identifier.

10. Apparatus according to claim 9, wherein the sound processor has associated therewith a store for storing respective voice recognition parameters for each of the people, and a parameter selector for selecting the voice recognition parameters to be used to process the sound data in dependence upon the person determined to be speaking by the speaker identifier.

11. Apparatus according to claim 9, further comprising a database for storing at least some of the received image data, the sound data, the text data produced by the sound processor and viewing data defining at whom at least the person who is speaking is looking, the database being arranged to store the data such that corresponding text data and viewing data are associated with each other and with the corresponding image data and sound data.

12. Apparatus according to claim 11, further comprising a data compressor for compressing the image data and the sound data for storage in the database.

13. Apparatus according to claim 12, wherein the data compressor comprises an encoder for encoding the image data and the sound data as MPEG data.

14. Apparatus according to claim 11, further comprising a gaze time data generator for generating gaze time data defining, for a predetermined period, the proportion of time spent by a given person looking at each of the other people during the predetermined period, and wherein the database is arranged to store the gaze time data so that it is associated with the corresponding image data, sound data, text data and viewing data.

15. Apparatus according to claim 14, wherein the predetermined period comprises a period during which the given person was talking.

16. A method of processing image data recorded by a plurality of cameras showing the movements of a plurality of people to select image data for storage, the method comprising:

a speaker identification step of determining which of the people is speaking;

a step of determining at whom the speaker is looking;

a step of determining the position of the speaker and the position of the person at whom the speaker is looking; and a camera selection step for selecting image data on the basis of the determined positions of the speaker and the person at whom the speaker is looking, wherein, in the camera selection step, image data is selected in which both the speaker and the person at whom the speaker is looking appear, quality values are generated representing a quality of the views that at least some of the cameras have of the speaker and the person at whom the speaker is looking, and the image data is selected on the basis of which camera has the quality value representing the highest quality.

17. A method according to claim 16, wherein, in the camera selection step, processing is performed to determine which of the cameras have a view of the speaker and the person at whom the speaker is looking, and to generate a respective quality value for each camera which has a view of the speaker and the person at whom the speaker is looking.

18. A method according to claim 16, wherein, in the camera selection step, each quality value is generated in dependence upon the position and orientation of the head of the speaker and the position and orientation of the head of the person at whom the speaker is looking.

19. A method according to claim 16, wherein, in the camera selection step pre-stored data defining a camera from which image data is to be selected for respective pairs of positions is used to select the image data in dependence upon the positions of the speaker and the person at whom the speaker is looking.

20. A method according to claim 16, wherein, in the steps of determining at whom the speaker is looking and determining the positions of the speaker and the person at whom the speaker is looking, image data from at least one of the cameras is processed to determine at whom the speaker is looking and the positions.

21. A method according to claim 20, wherein the image data from that at least one camera is processed to determine the position of each person and at whom each person is looking.

22. A method according to claim 20, wherein image data is processed to track the position and orientation of each person's head in three dimensions.

23. A method according to claim 16, wherein speech data is received from a plurality of microphones each of which is allocated to a respective one of the people, and, in the speaker identification step, it is determined which of the people is speaking on the basis of the microphone from which the speech data was received.

24. A method according to claim 16, further comprising a sound processing step of processing sound data defining words spoken by the people to generate text data therefrom in dependence upon the result of the processing performed in the speaker identification step.

25. A method according to claim 24, wherein the sound processing step includes selecting, from among stored respective voice recognition parameters for each of the people, the voice recognition parameters to be used to process the sound data in dependence upon the person determined to be speaking in the speaker identification step.

26. A method according to claim 24, further comprising the step of storing in a database at least some of the received image data, the sound data, the text data produced in the sound processing step and viewing data defining at whom at least the person who is speaking is looking, the data being stored in the database such that corresponding text data and viewing data are associated with each other and with the corresponding image data and sound data.

27. A method according to claim 26, wherein the image data and the sound data are stored in the database in compressed form.

28. A method according to claim 27, wherein the image data and the sound data are stored as MPEG data.

29. A method according to claim 26, further comprising the steps of generating data defining, for a predetermined period, the proportion of time spent by a given person looking at each of the other people during the predetermined period, and storing the data in the database so that it is associated with the corresponding image data, sound data, text data and viewing data.

30. A method according to claim 29, wherein the predetermined period comprises a period during which the given person was talking.

31. A method according to claim 26, further comprising the step of generating a signal conveying the database with data therein.

32. A method according to claim 31, further comprising the step of recording the signal either directly or indirectly to generate a recording thereof.

33. A method according to claim 16, further comprising the step of generating a signal conveying information defining the image data selected in the camera selection step.

* * * * *

UNITED STATES PATENT AND TRADEMARK OFFICE
CERTIFICATE OF CORRECTION

| | |
|---|---|
| PATENT NO. | : 7,113,201 B1 |
| APPLICATION NO. | : 09/533398 |
| DATED | : September 26, 2006 |
| INVENTOR(S) | : Michael James Taylor et al. |

It is certified that error appears in the above-identified patent and that said Letters Patent is hereby corrected as shown below:

ON THE TITLE PAGE, ITEM (75) INVENTORS

"Michael James Taylor, Surrey (GB);
Simon Michael Rowe, Surrey (GB)"

should read

--Michael James Taylor, Guildford (GB);
Simon Michael Rowe, Guildford (GB)--.

ON THE TITLE PAGE, ITEM (56) OTHER PUBLICATIONS

After "Wiles, C.,": "Perceptual User Interfaces." should read --Multi-view Modelling and Analysis of Visual Scenes, ISBN 0769501109.--.

SHEET 24

FIG. 20, "INTEROGATION" (both occurrences) should read --INTERROGATION--.

COLUMN 2

Line 62, "etc" should read --etc.,--.

COLUMN 9

Line 67, "because is" should read --because it--.

COLUMN 10

Line 1, "it" should read --is--.

COLUMN 12

Line 59, close up right margin; and
Line 60, close up left margin.

COLUMN 15

Line 42, "archive ?" should read --archive--.

UNITED STATES PATENT AND TRADEMARK OFFICE
CERTIFICATE OF CORRECTION

PATENT NO. : 7,113,201 B1
APPLICATION NO. : 09/533398
DATED : September 26, 2006
INVENTOR(S) : Michael James Taylor et al.

It is certified that error appears in the above-identified patent and that said Letters Patent is hereby corrected as shown below:

COLUMN 16

Line 6, close up right margin; and
    Line 7, close up left margin.

COLUMN 18

Line 23, "participants)" should read --participant(s)--.

COLUMN 22

Line 62, "that" should read --the--.

Signed and Sealed this

Eighth Day of July, 2008

JON W. DUDAS
*Director of the United States Patent and Trademark Office*